(12) United States Patent
Uenodan et al.

(10) Patent No.: US 10,775,215 B2
(45) Date of Patent: Sep. 15, 2020

(54) FLOW METER

(71) Applicant: HITACHI AUTOMOTIVE SYSTEMS, LTD., Ibaraki (JP)

(72) Inventors: Akira Uenodan, Hitachinaka (JP); Shinobu Tashiro, Hitachinaka (JP); Takeshi Morino, Hitachinaka (JP); Masatoshi Ogata, Tokyo (JP); Tsubasa Watanabe, Tokyo (JP); Norio Ishitsuka, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 202 days.

(21) Appl. No.: 15/770,993

(22) PCT Filed: Oct. 5, 2016

(86) PCT No.: PCT/JP2016/079559
§ 371 (c)(1),
(2) Date: Apr. 25, 2018

(87) PCT Pub. No.: WO2017/073271
PCT Pub. Date: May 4, 2017

(65) Prior Publication Data
US 2018/0306619 A1   Oct. 25, 2018

(30) Foreign Application Priority Data
Oct. 28, 2015 (JP) .................................. 2015-211398

(51) Int. Cl.
*G01F 1/684* (2006.01)
*G01F 5/00* (2006.01)

(52) U.S. Cl.
CPC ................ *G01F 1/684* (2013.01); *G01F 5/00* (2013.01)

(58) Field of Classification Search
CPC ....................................................... G01F 1/684
See application file for complete search history.

(56) References Cited

U.S. PATENT DOCUMENTS 7,053,749 B2 * 5/2006 Ishida .................... H01C 1/144
338/323
9,599,496 B2 * 3/2017 Asano .................... G01F 1/684
(Continued)

FOREIGN PATENT DOCUMENTS

| JP | 2004-212103 A | 7/2004 |
| JP | 2009-198248 A | 9/2009 |
| WO | 2013/121095 A1 | 8/2013 |

OTHER PUBLICATIONS

International Search Report for WO 20171073271 A1, dated Jan. 24, 2017.

*Primary Examiner* — Justin N Olamit
(74) *Attorney, Agent, or Firm* — Volpe and Koenig, P.C.

(57) ABSTRACT

To obtain a flow meter with which it is possible to facilitate establishing an electrical connection with a conductor exposed in a location through which a gas to be measured passes. A flow meter that is provided with a lead and a circuit component placed on the lead, and that has a package in which part of the lead is molded from a resin, wherein the package is provided with an exposure portion for exposing part of the lead from the resin member, the exposure portion being electrically connected to a conductor that constitutes part of an auxiliary passage.

10 Claims, 30 Drawing Sheets

(56) References Cited

U.S. PATENT DOCUMENTS

| | | | |
|---|---|---|---|
| 9,658,091 B2* | 5/2017 | Tokuyasu | F02D 41/187 |
| 10,006,793 B2* | 6/2018 | Unger | G01F 1/684 |
| 2004/0168513 A1 | 9/2004 | Aoshima et al. | |
| 2013/0061684 A1 | 3/2013 | Frauenholz et al. | |
| 2015/0040653 A1 | 2/2015 | Konzelmann et al. | |
| 2019/0120675 A1* | 4/2019 | Watanabe | G01F 15/14 |

* cited by examiner

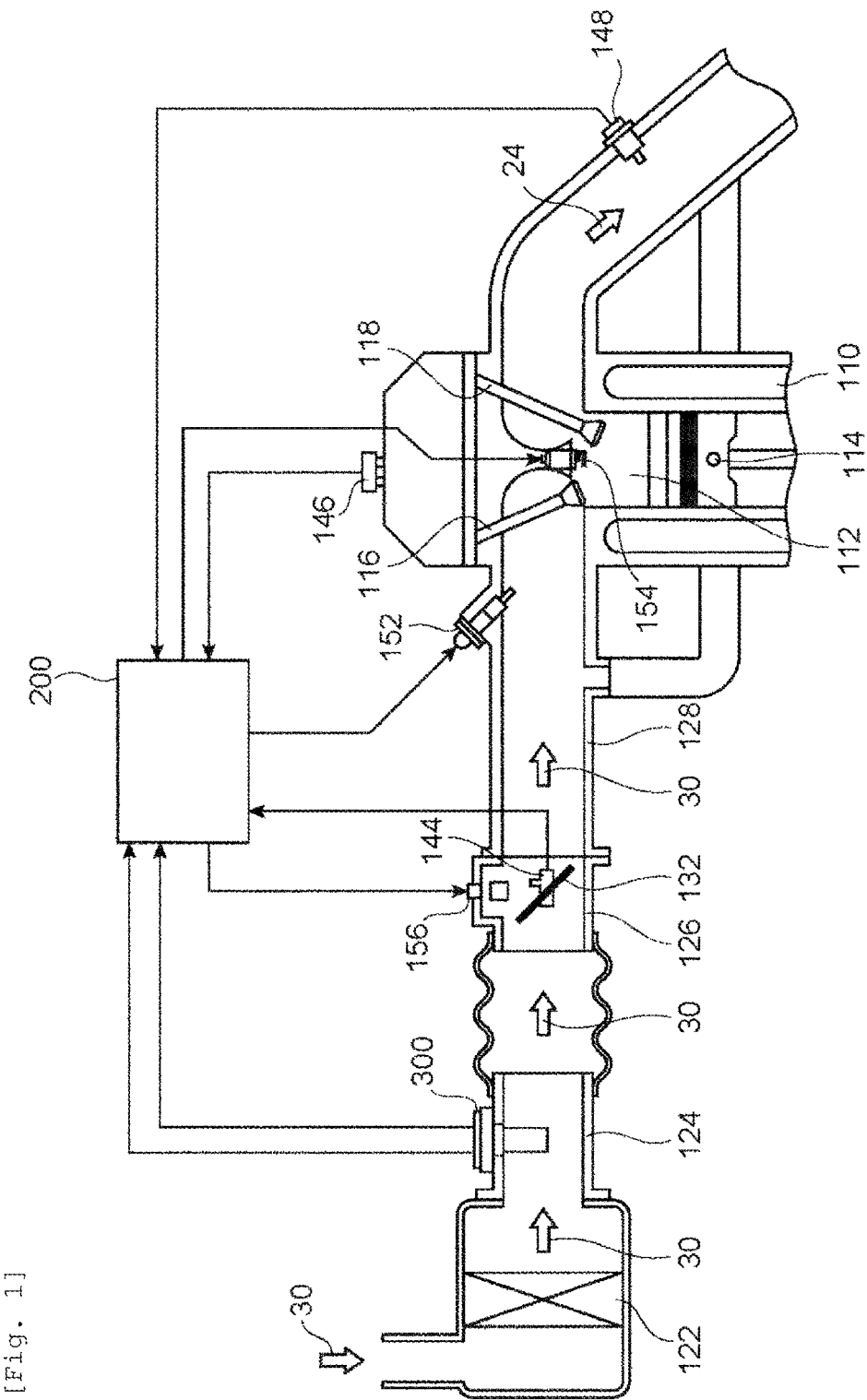
[Fig. 1]

[Fig. 2A]
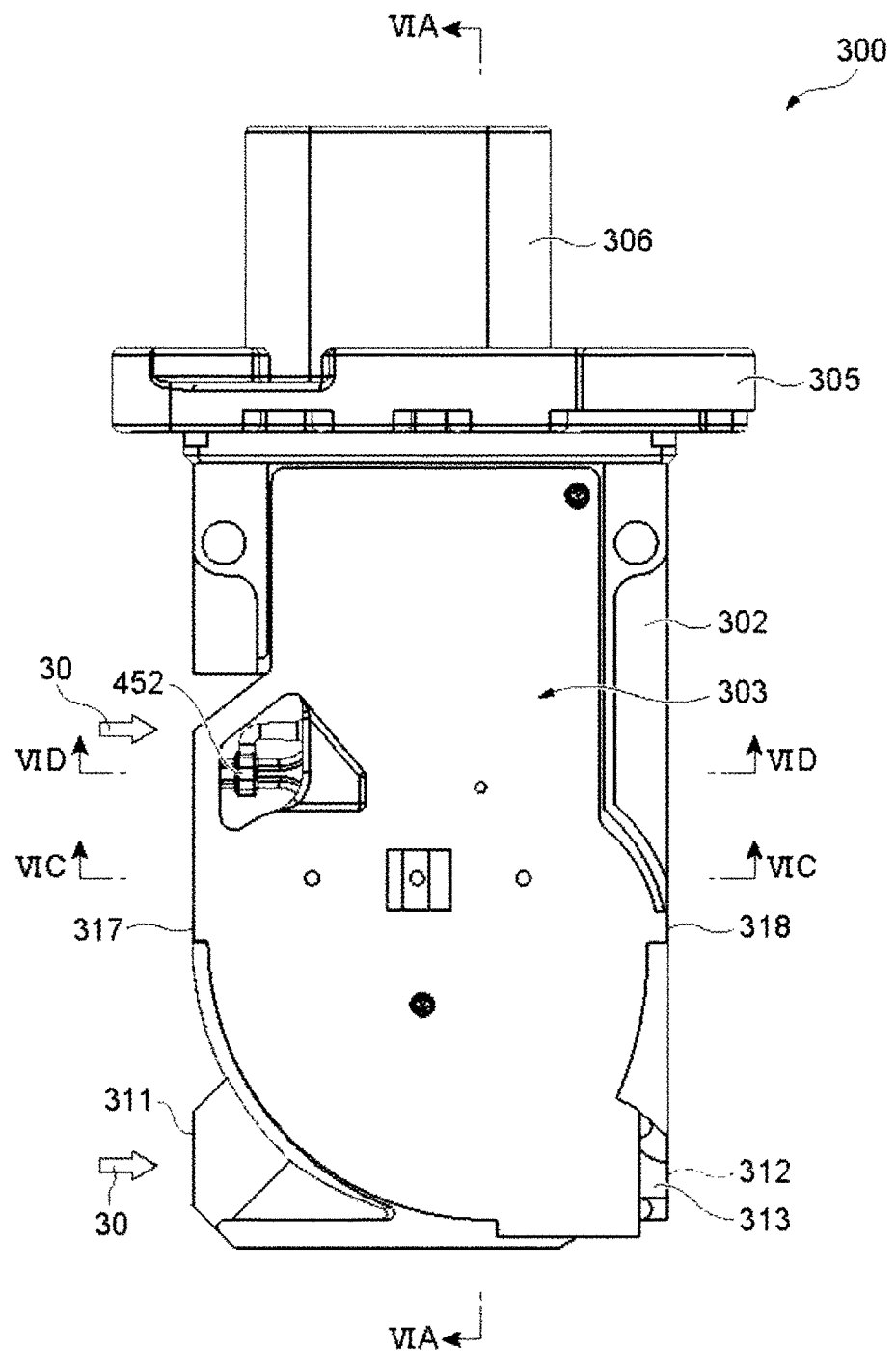

[Fig. 2B]
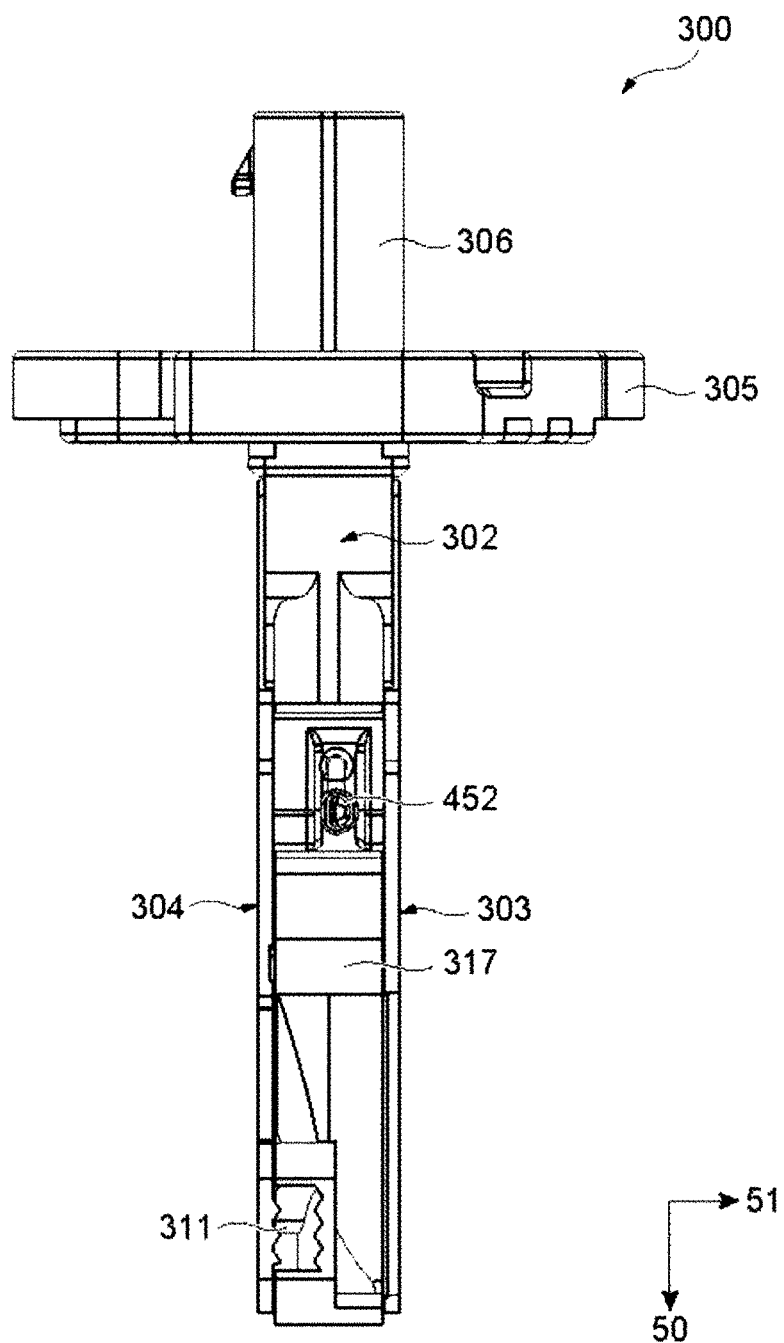

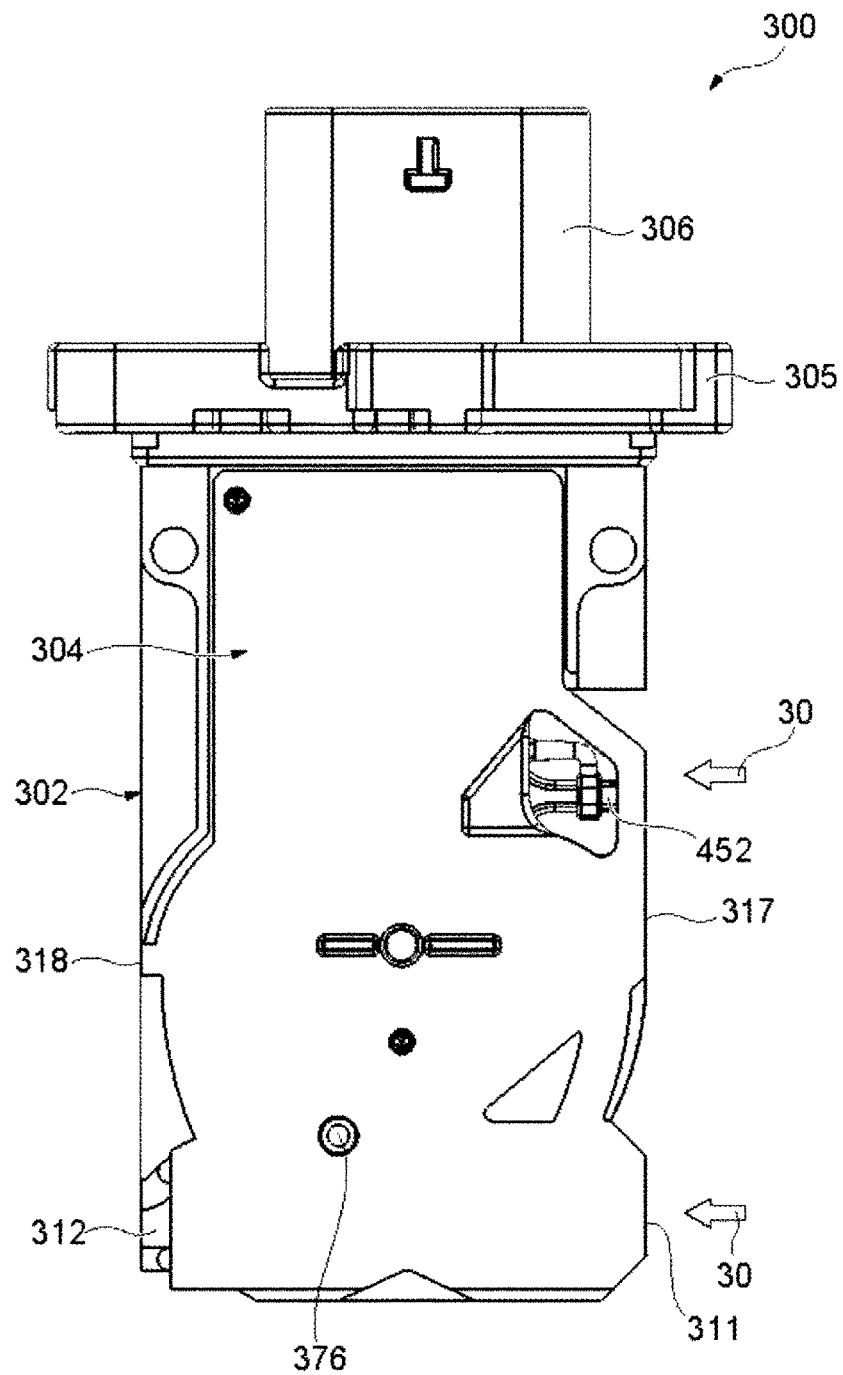
[Fig. 2C]

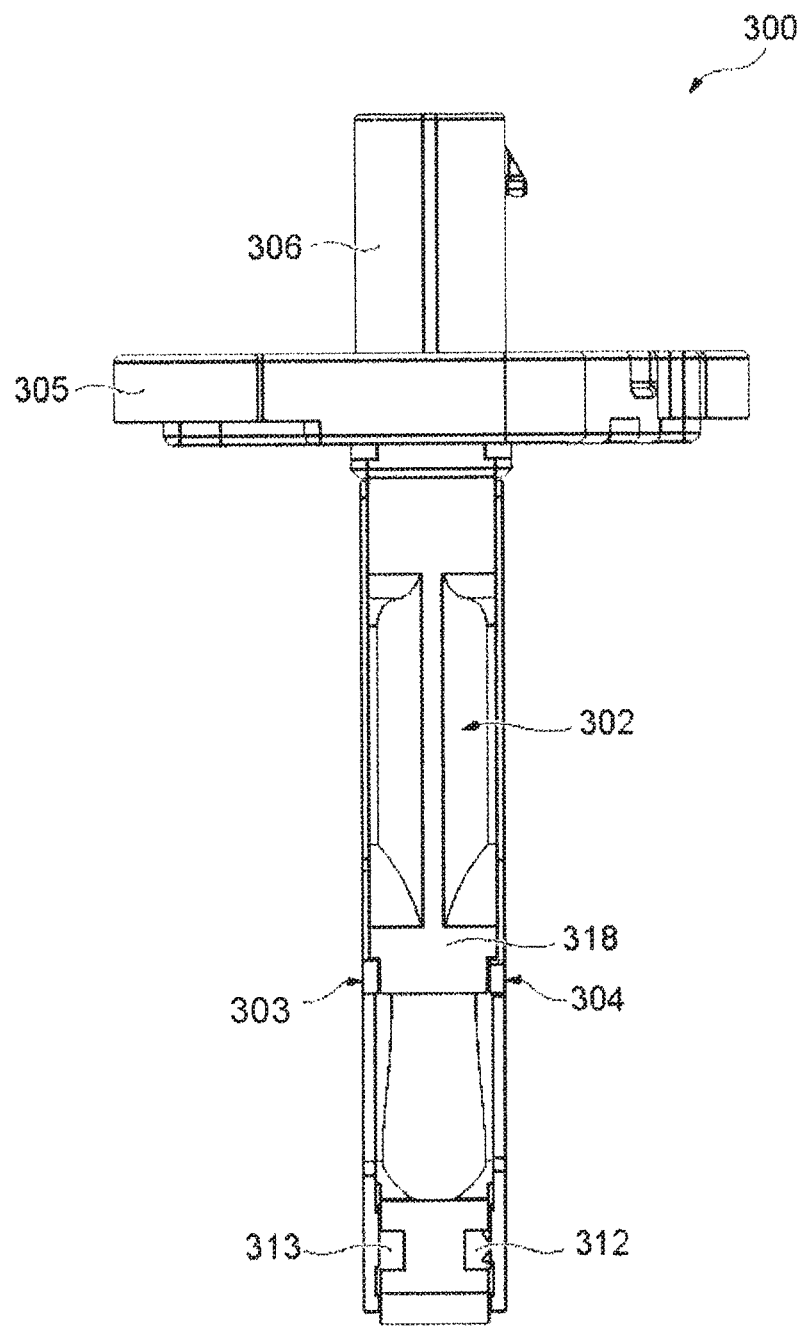
[Fig. 2D]

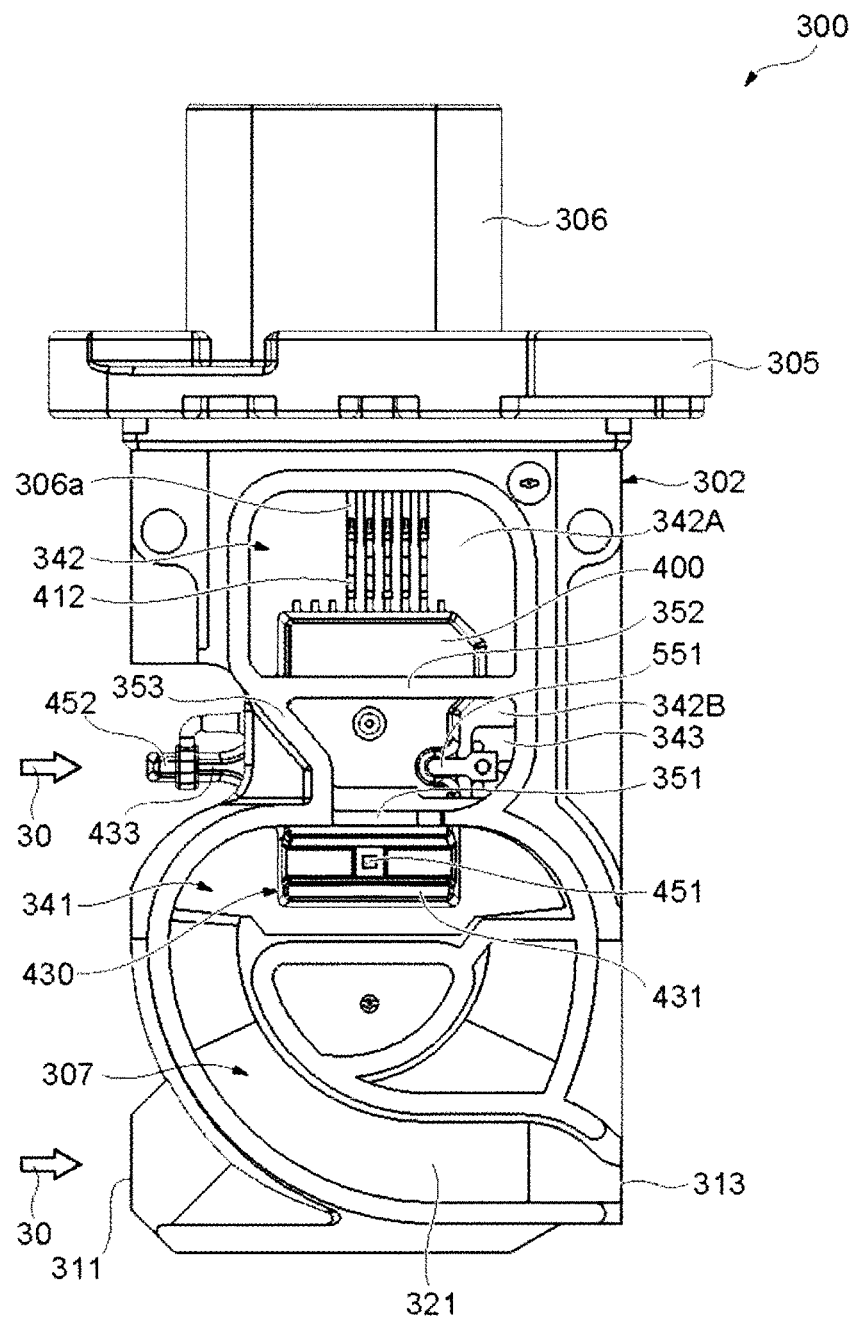
[Fig. 3A]

[Fig. 3B]
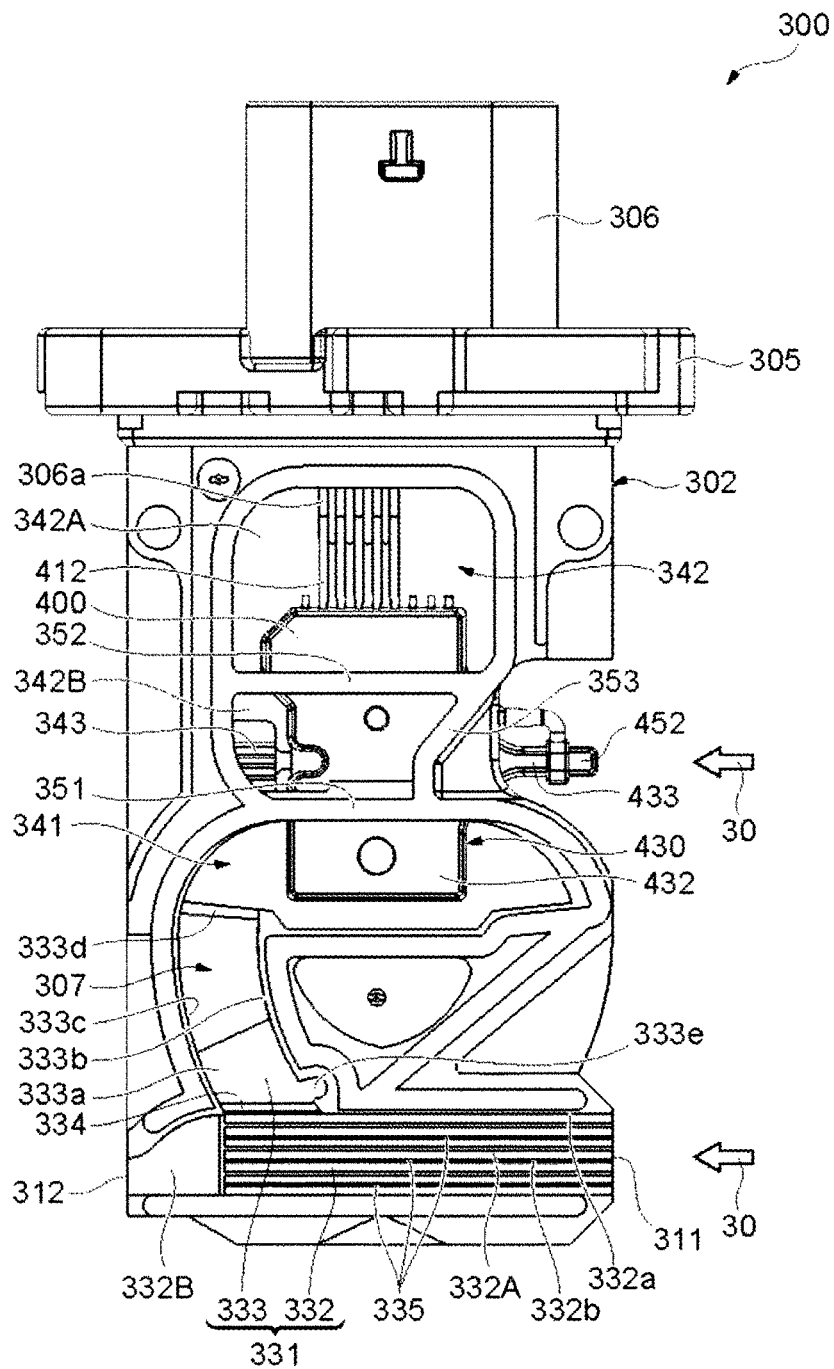

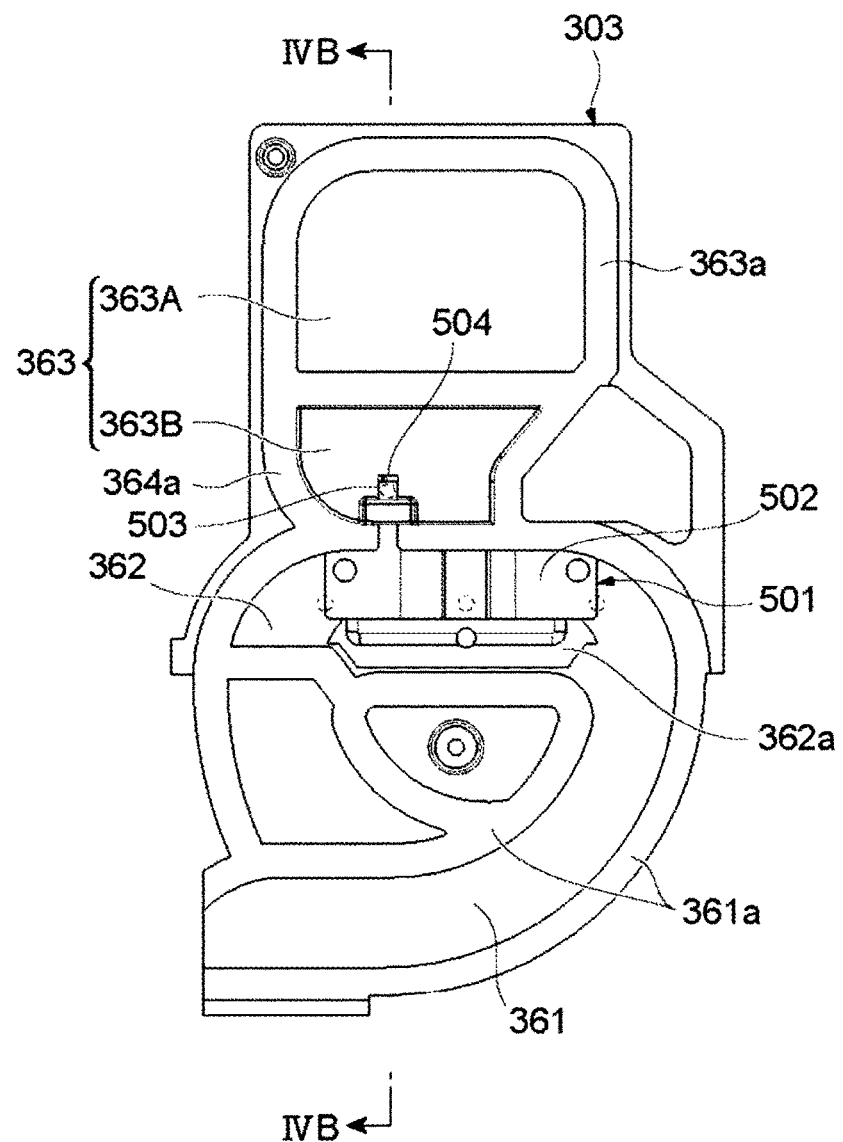
[Fig. 4A]

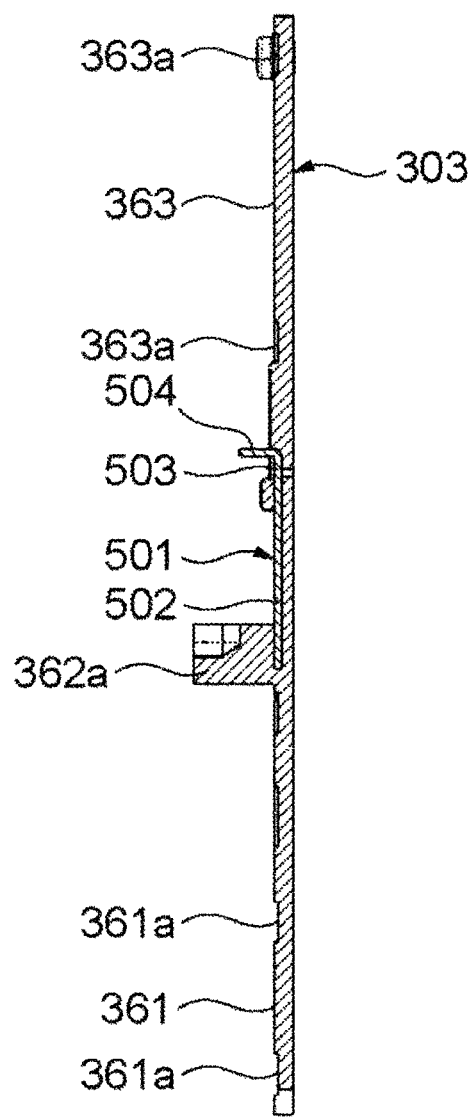
[Fig. 4B]

[Fig. 5A]
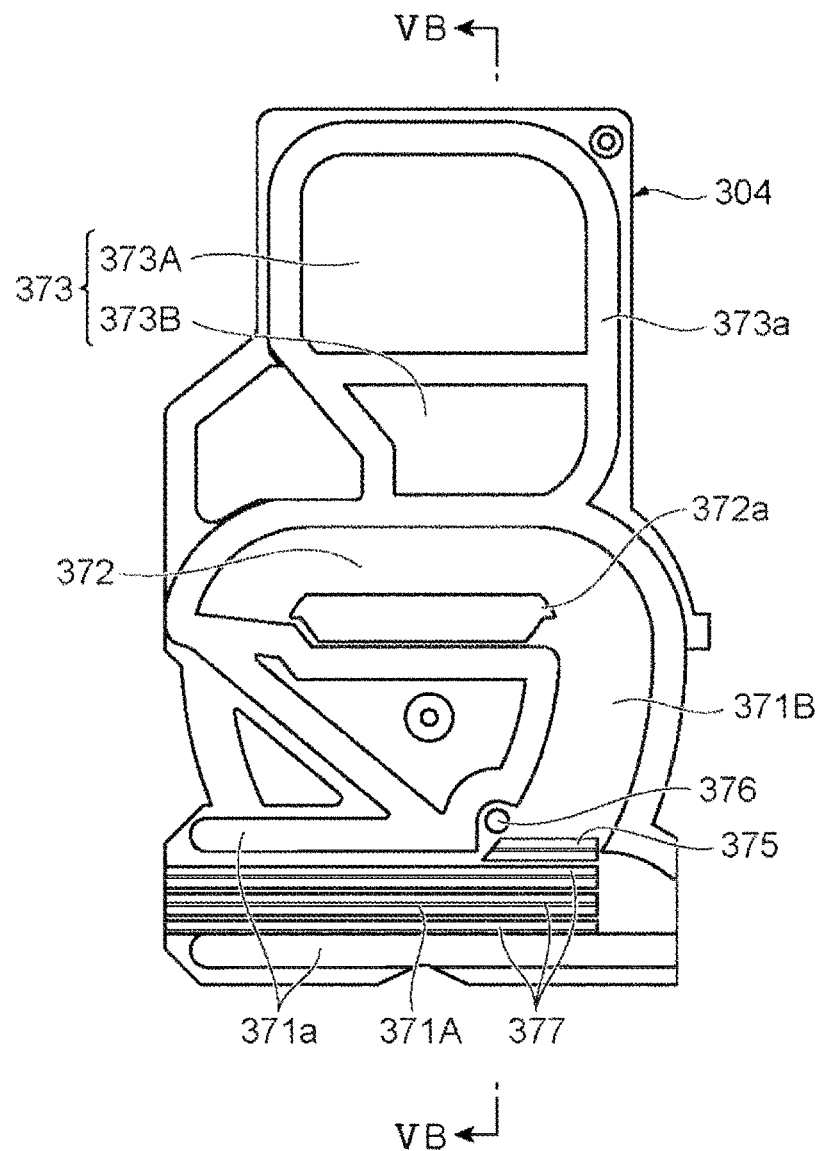

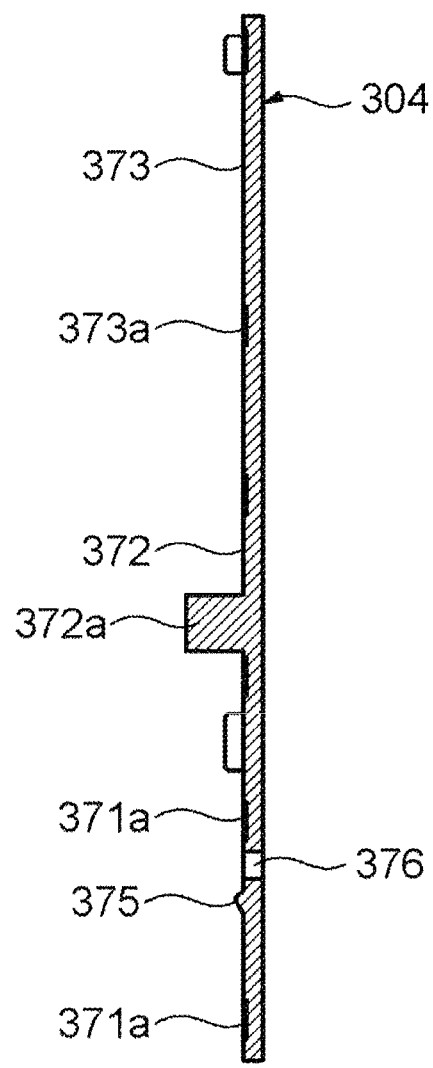
[Fig. 5B]

[Fig. 6A]
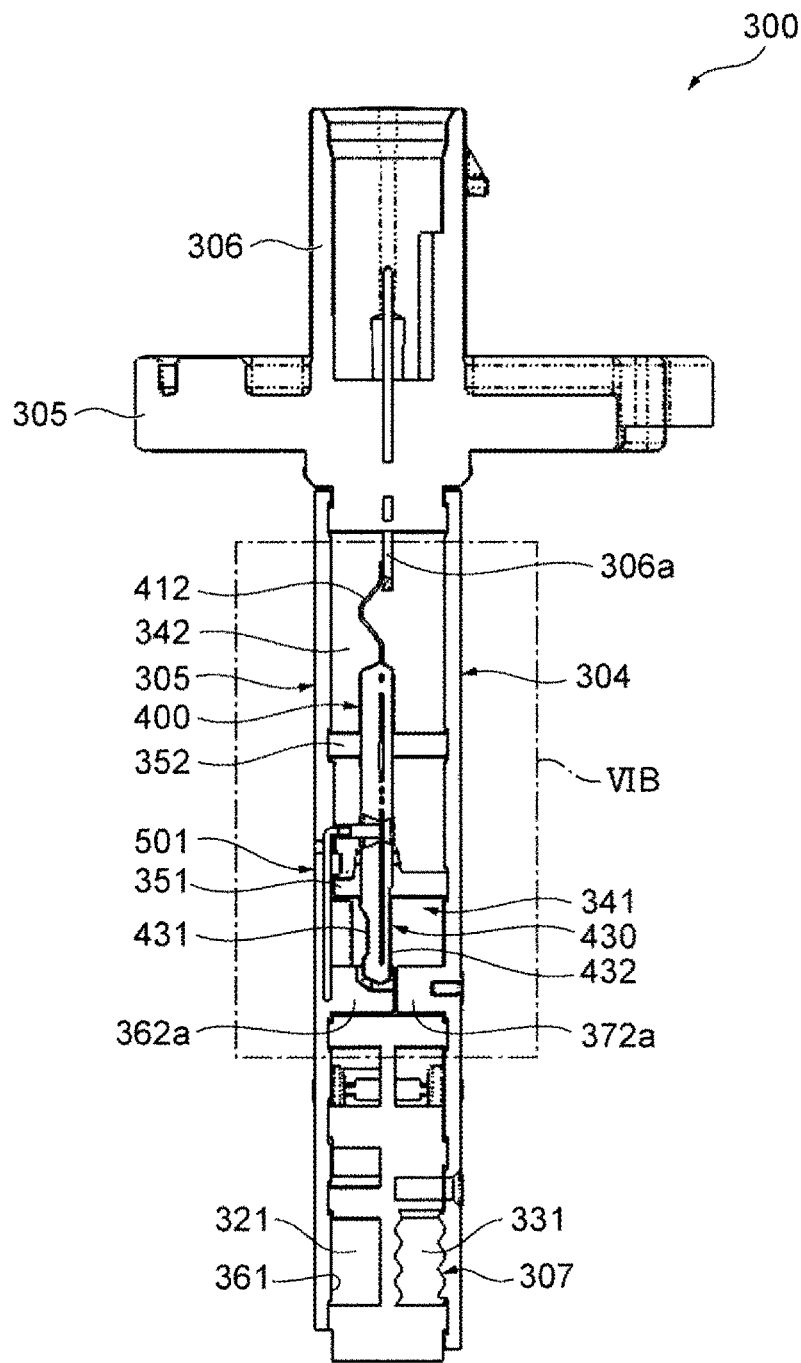

[Fig. 6B]
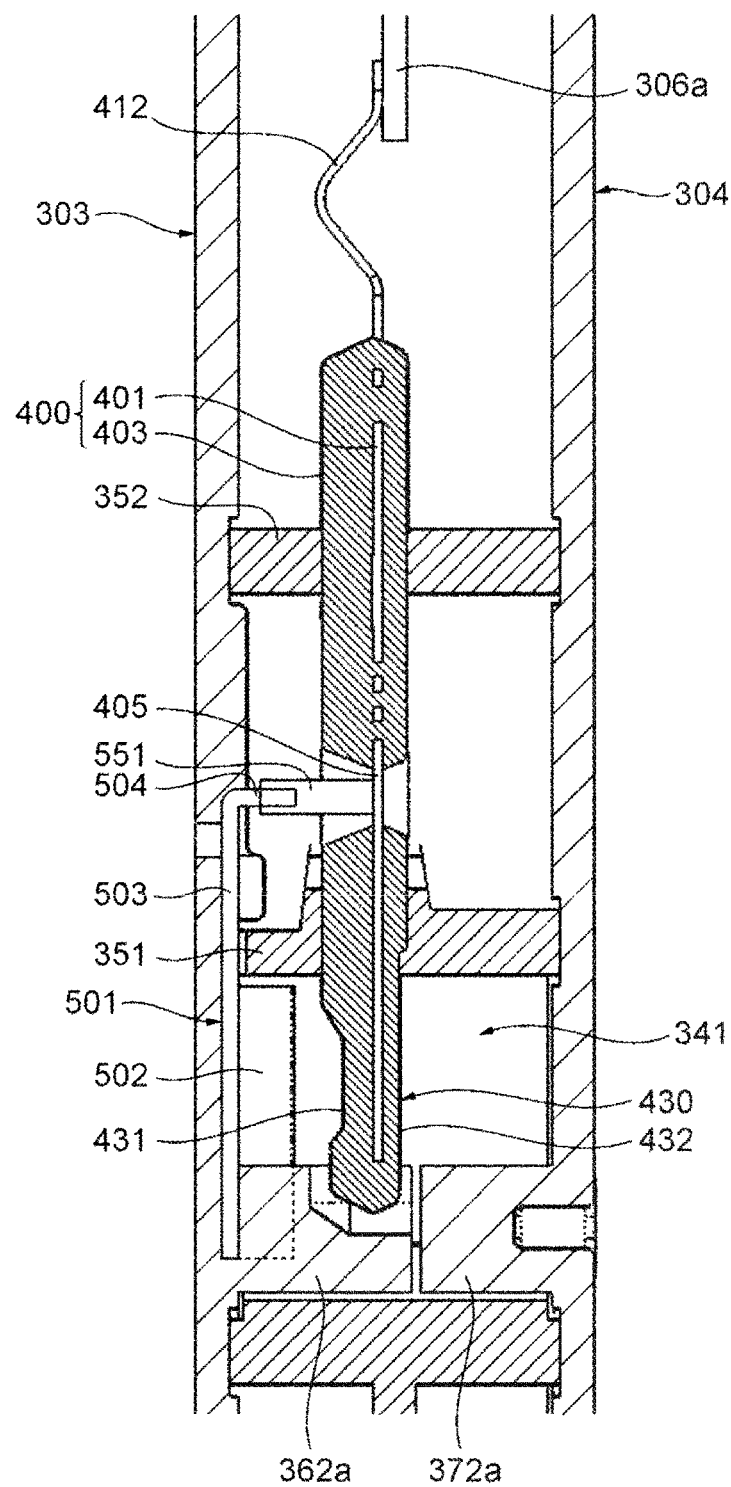

[Fig. 6C]
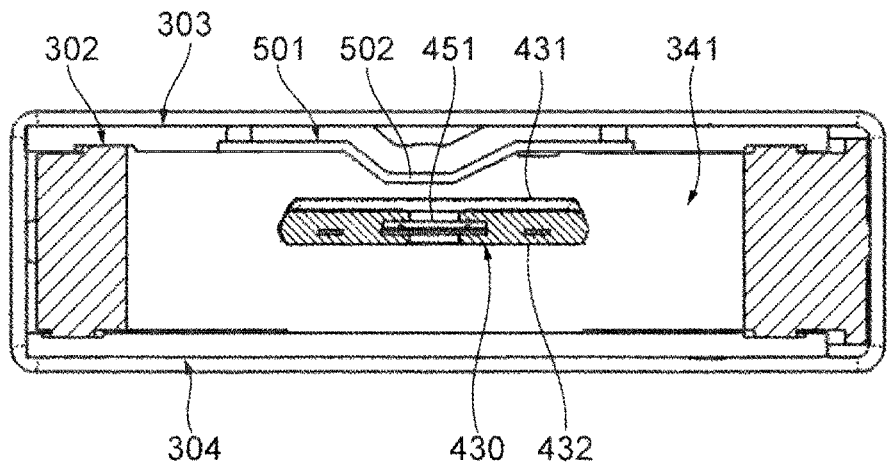
[Fig. 6D]
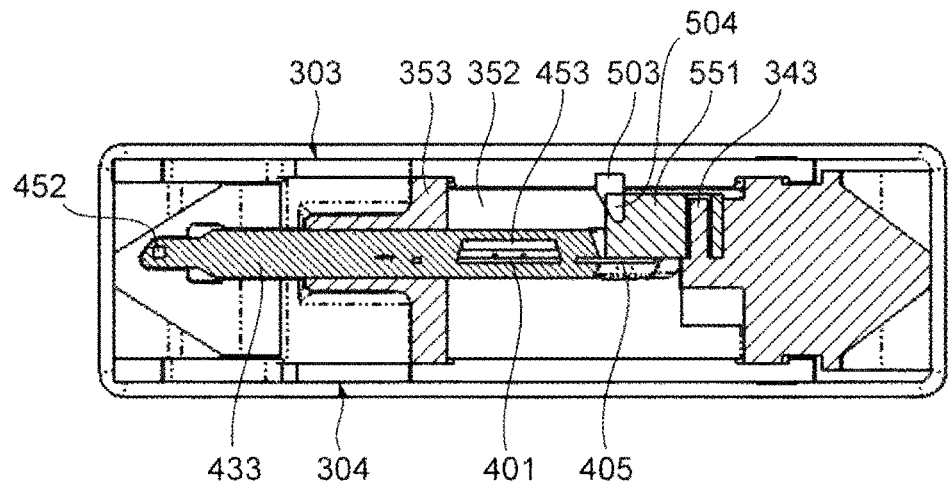

[Fig. 7]
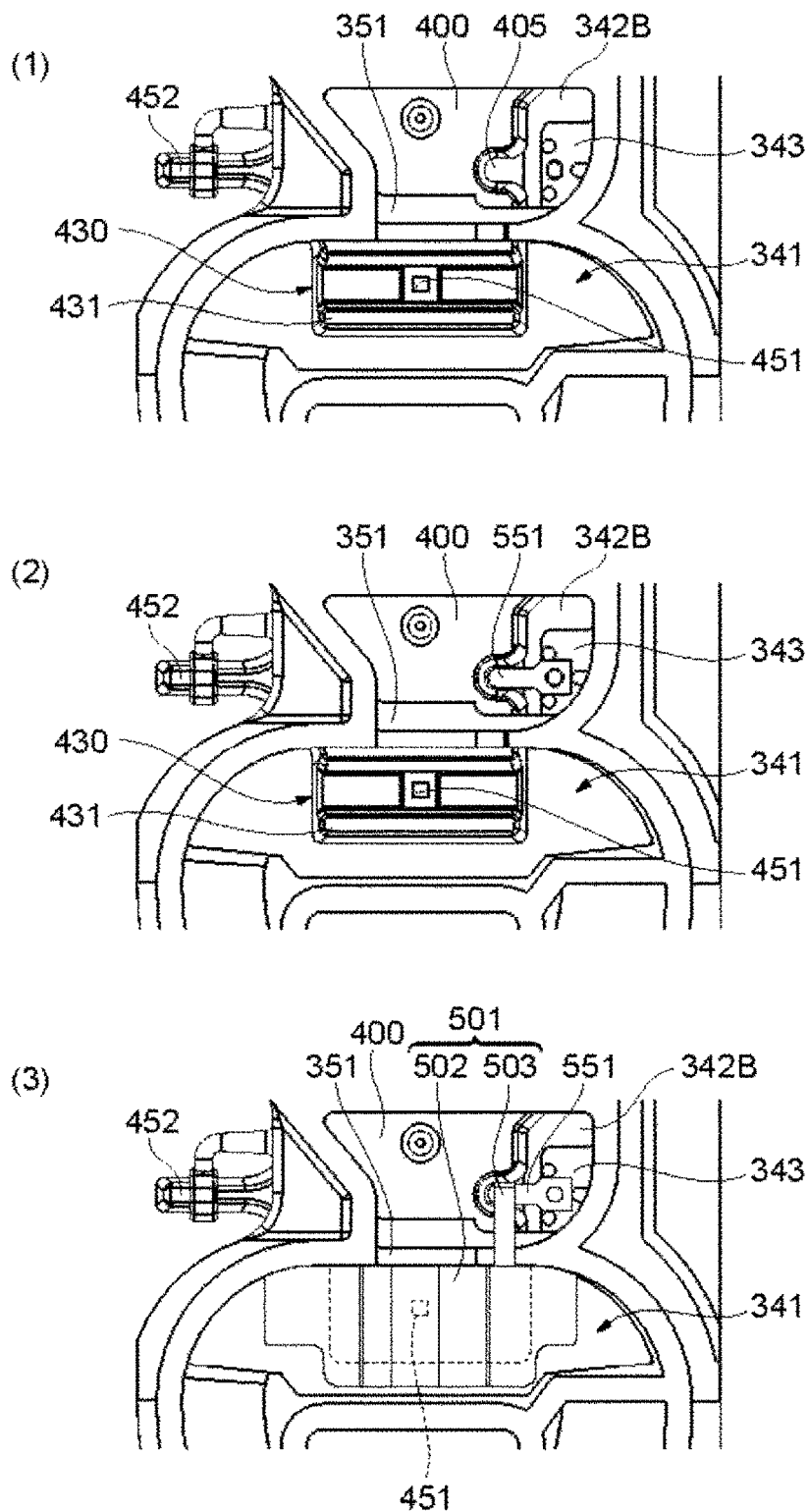

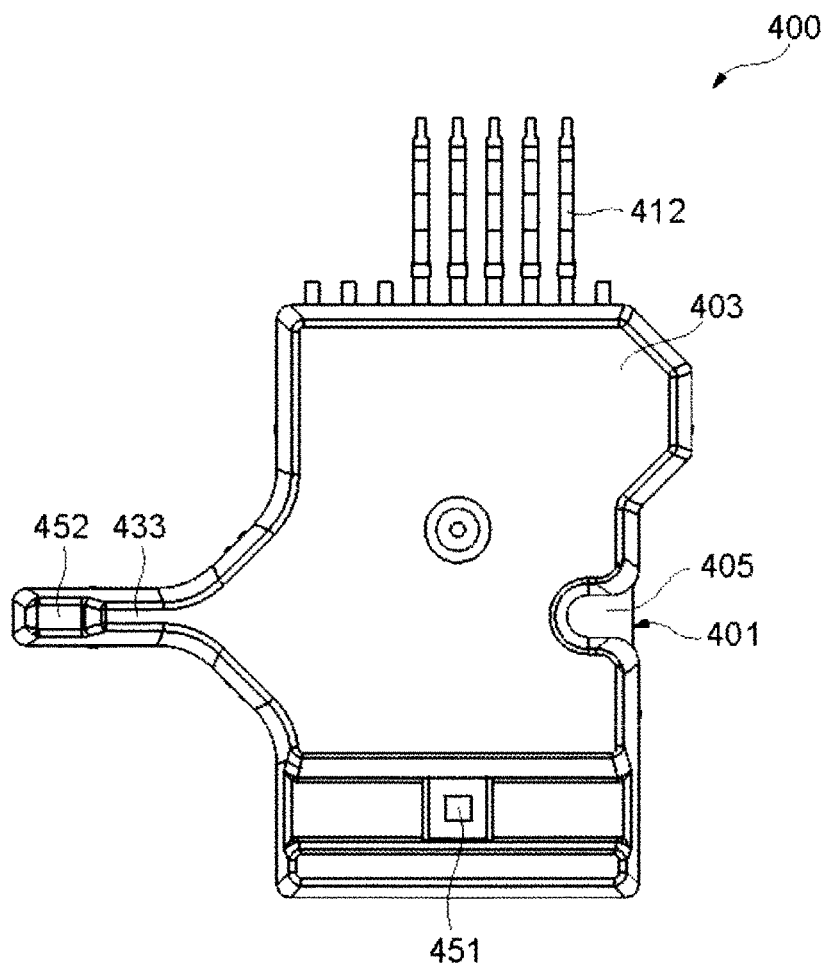
[Fig. 8]

[Fig. 9]
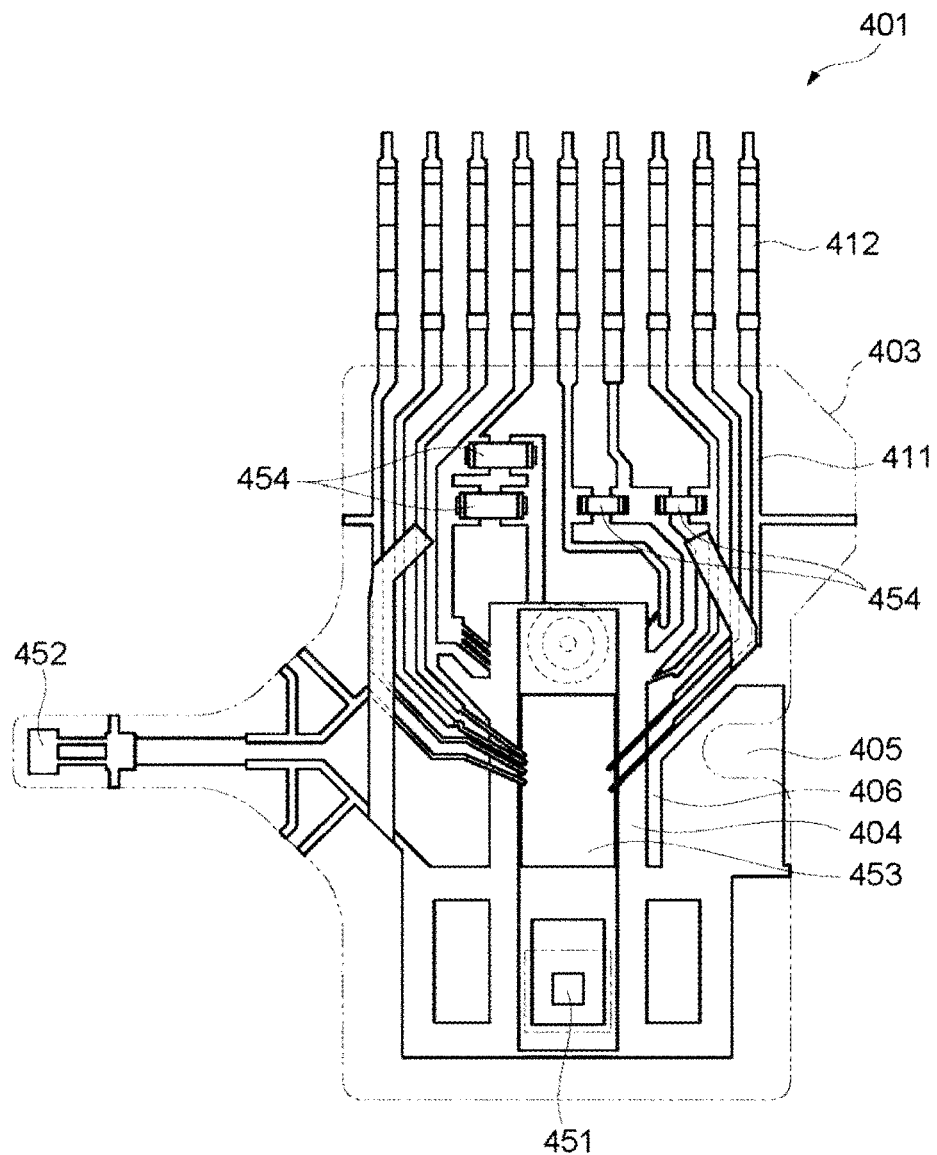

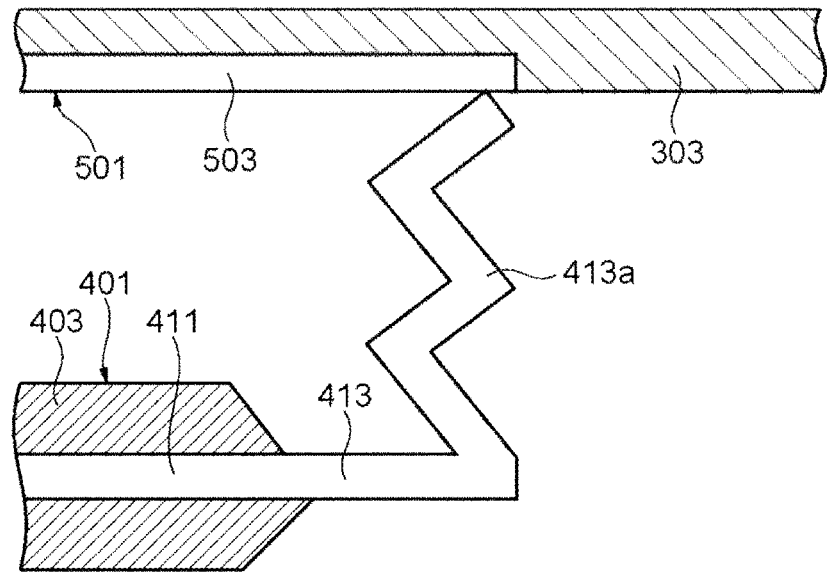
[Fig. 10A]
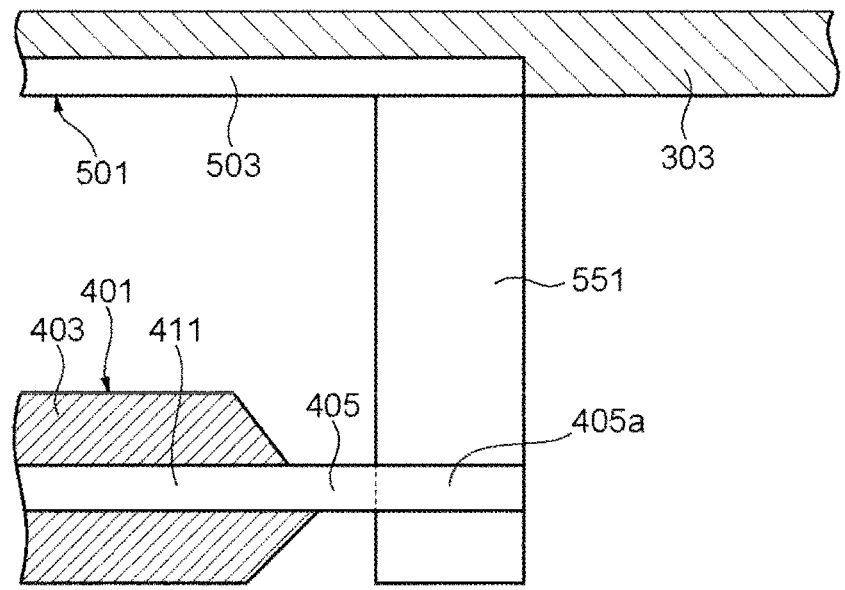
[Fig. 10B]

[Fig. 10C]
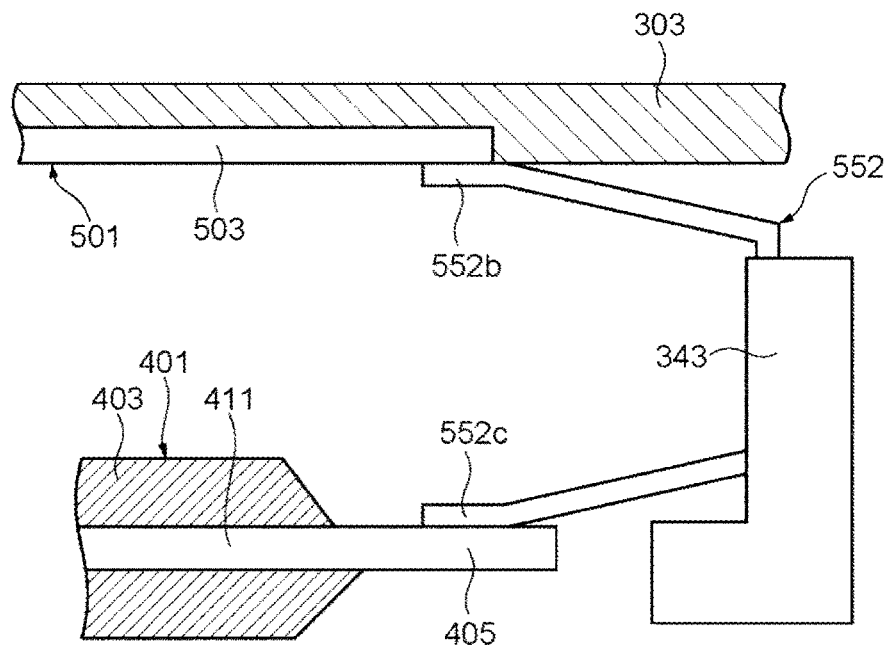
[Fig. 10D]
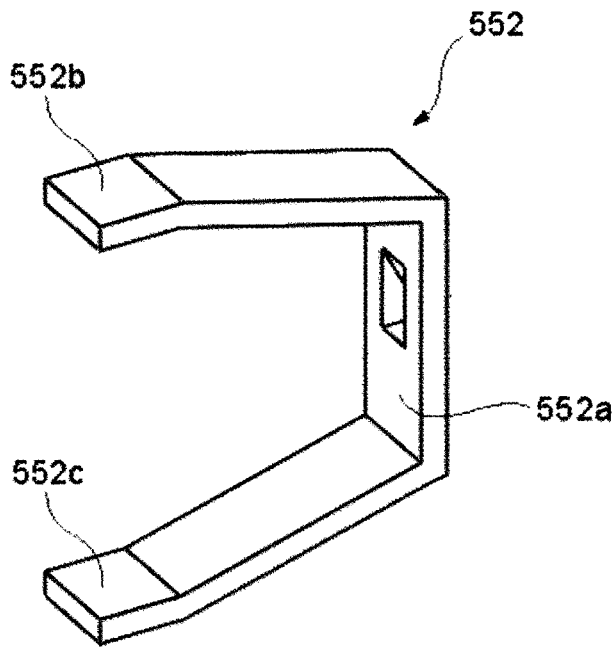

[Fig. 10E]
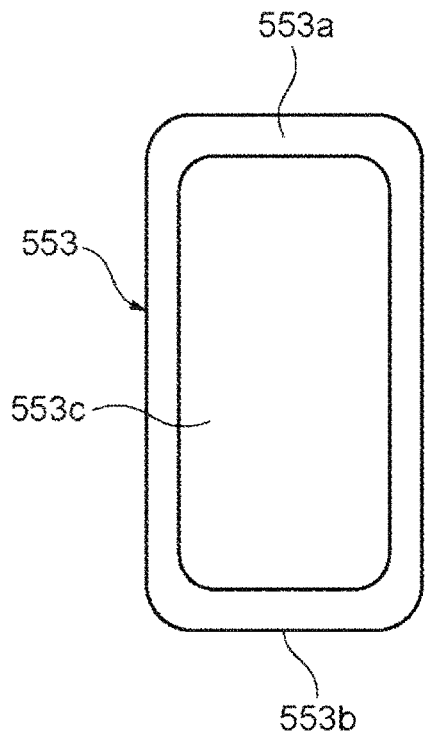
[Fig. 10F]
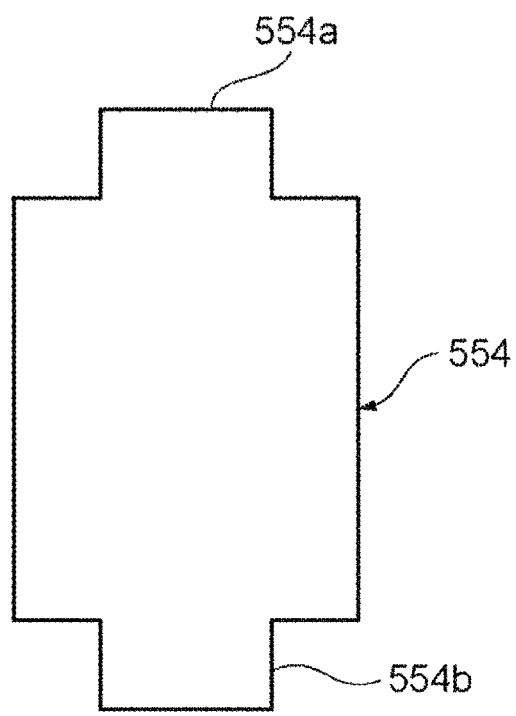

[Fig. 11]
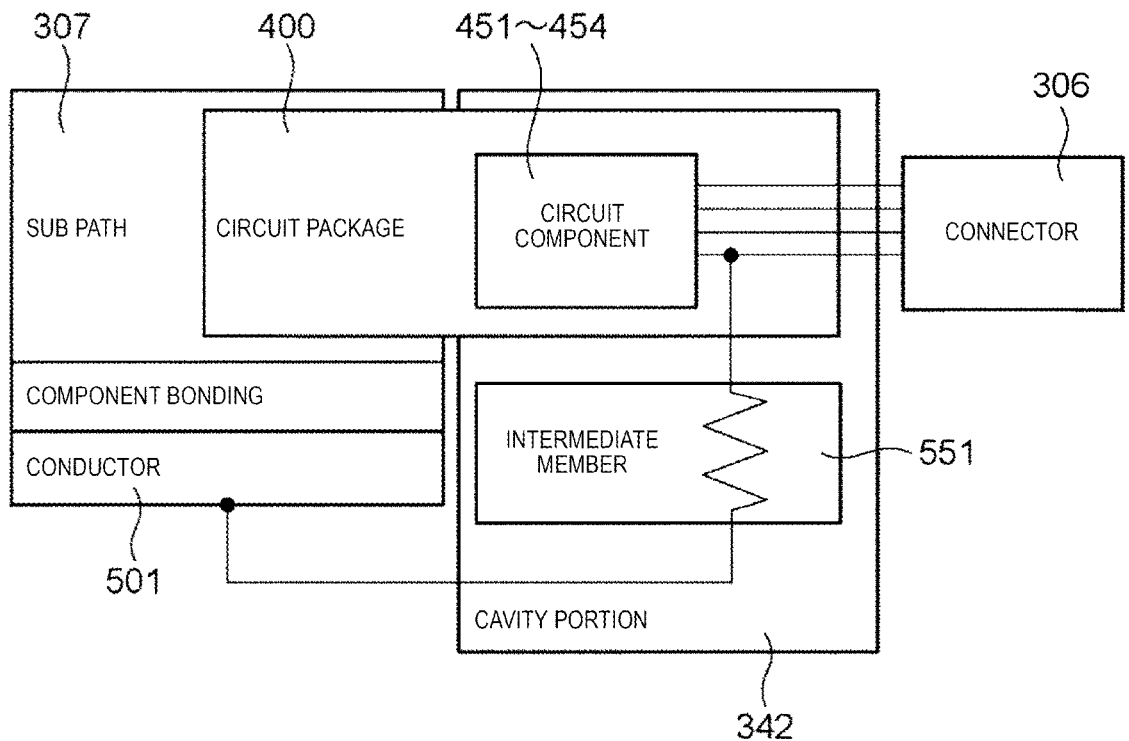
[Fig. 12]
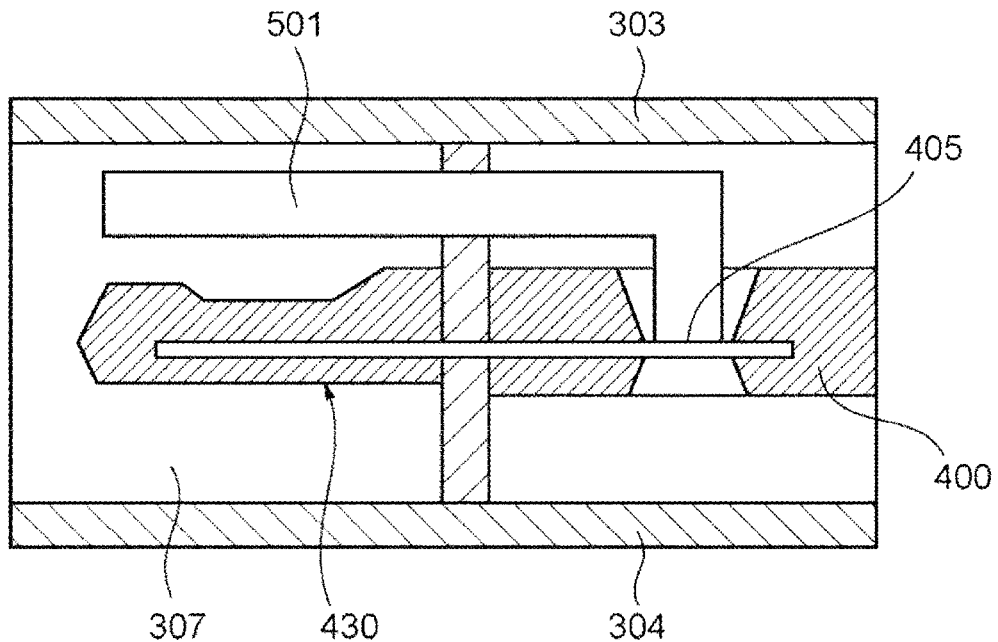

[Fig. 13A]
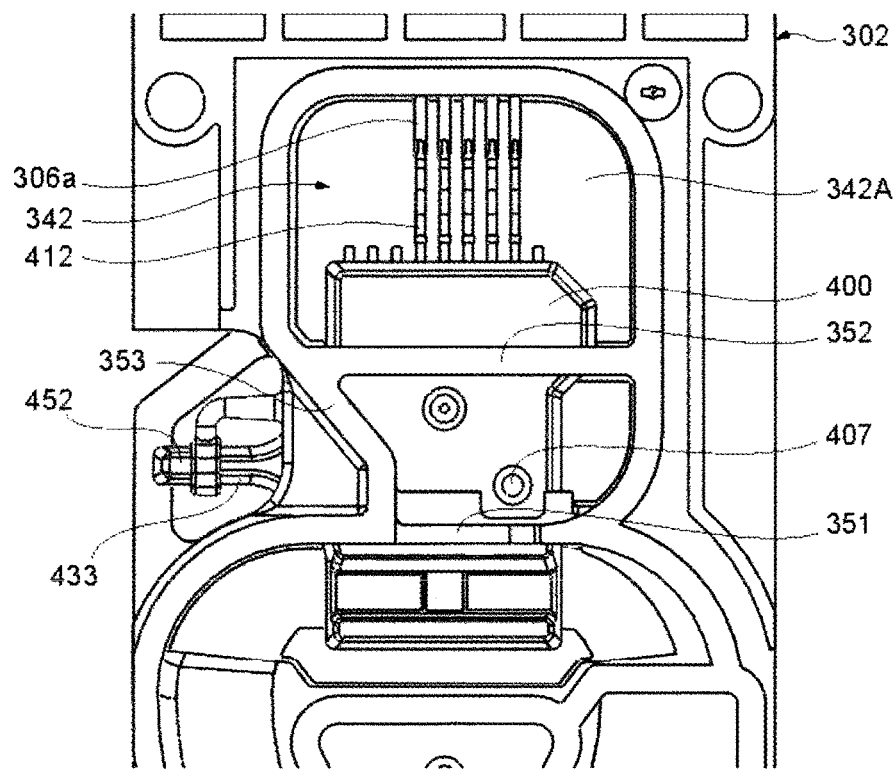
[Fig. 13B]
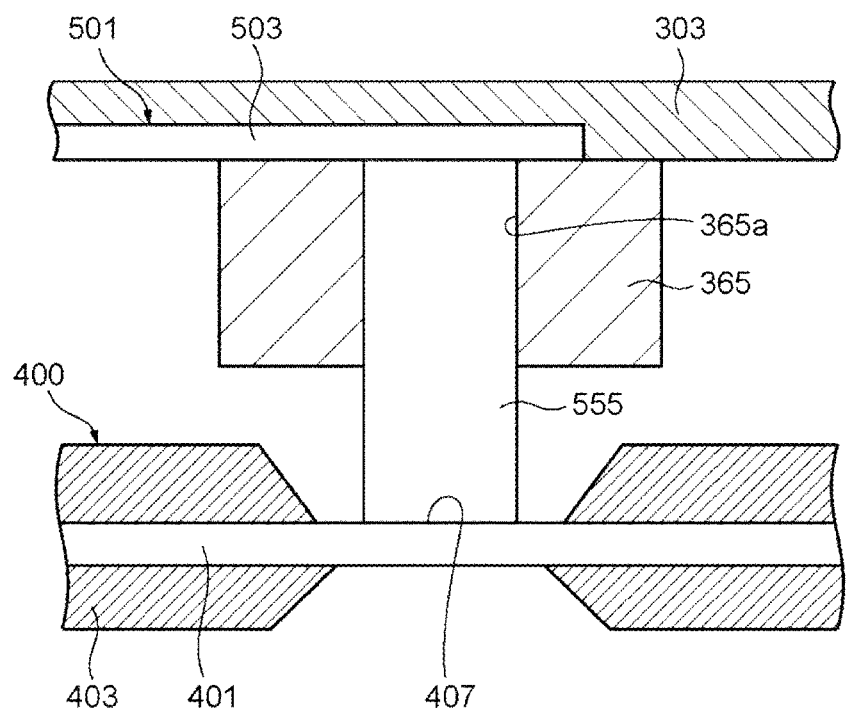

[Fig. 13C]
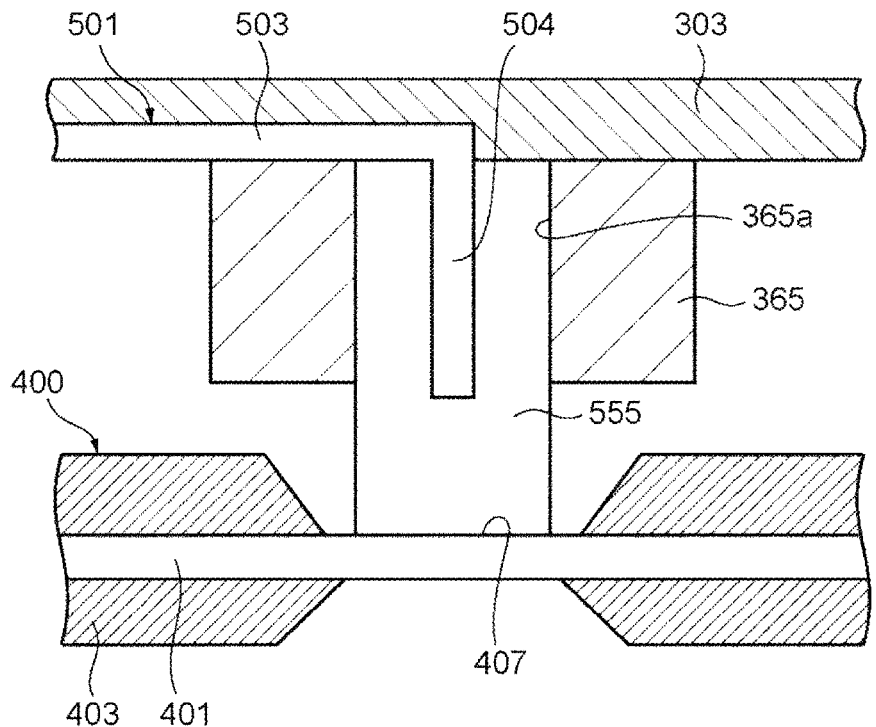
[Fig. 13D]
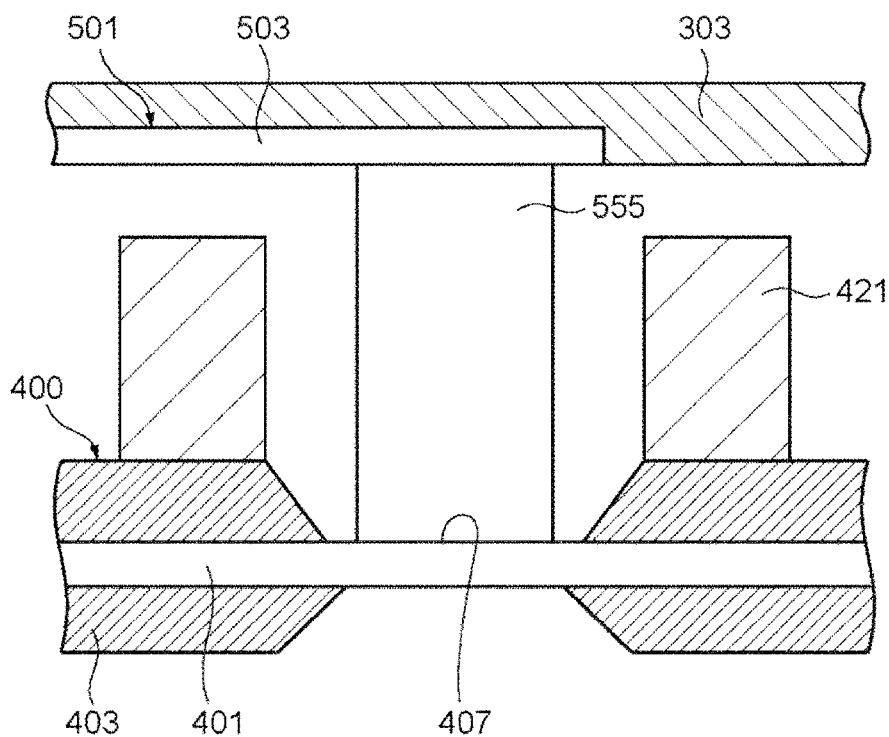

[Fig. 13E]
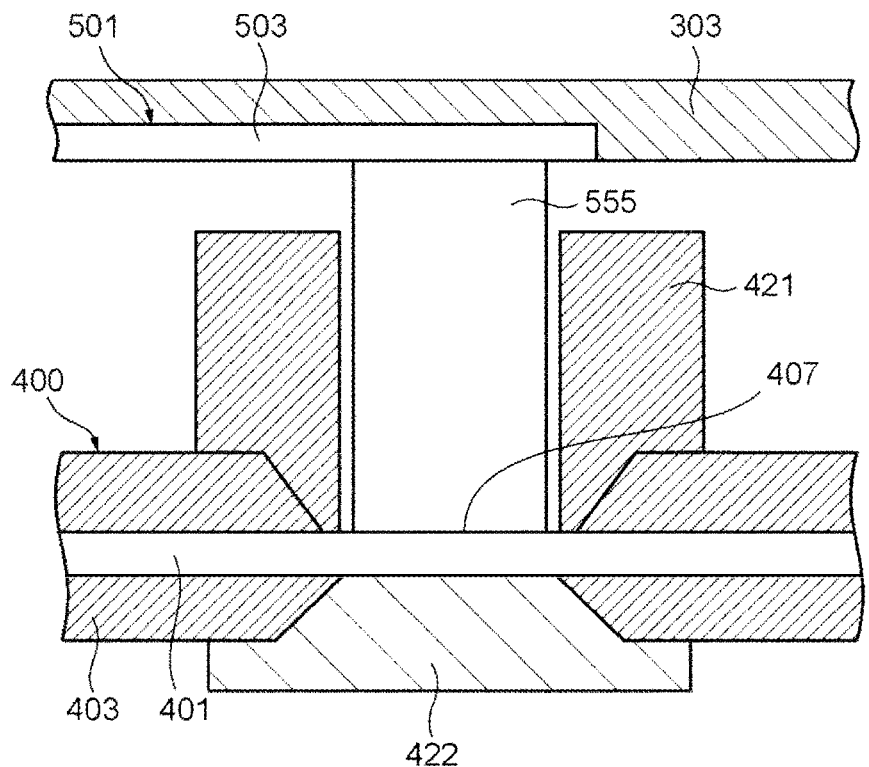
[Fig. 14A]
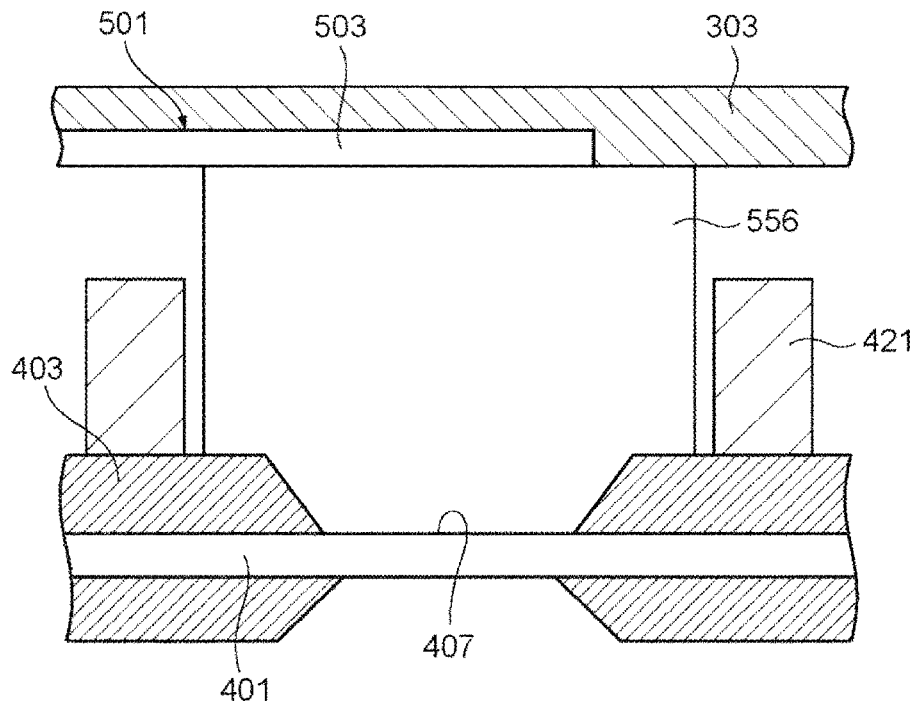

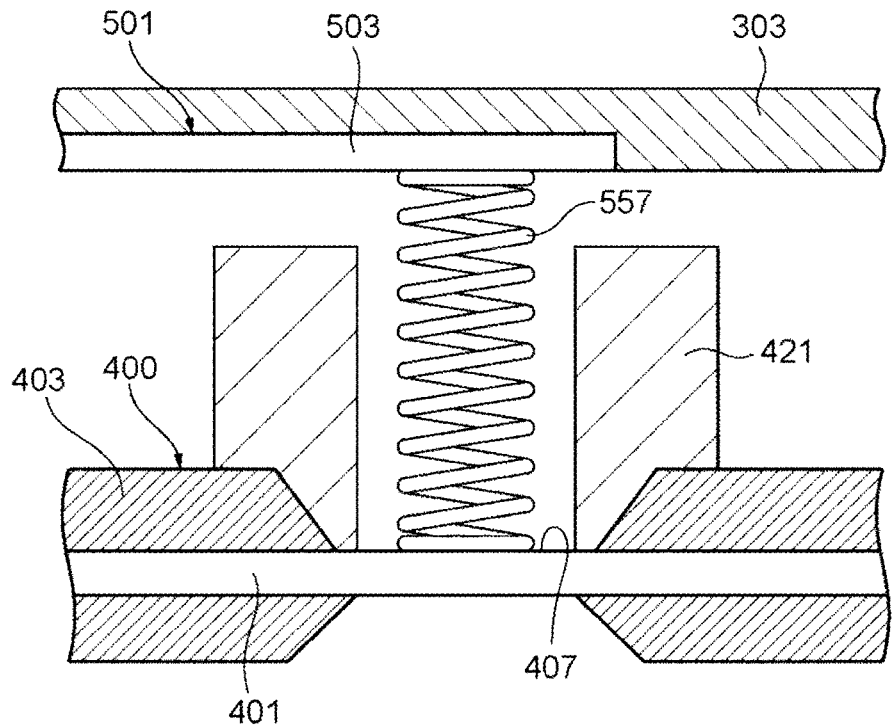
[Fig. 14B]
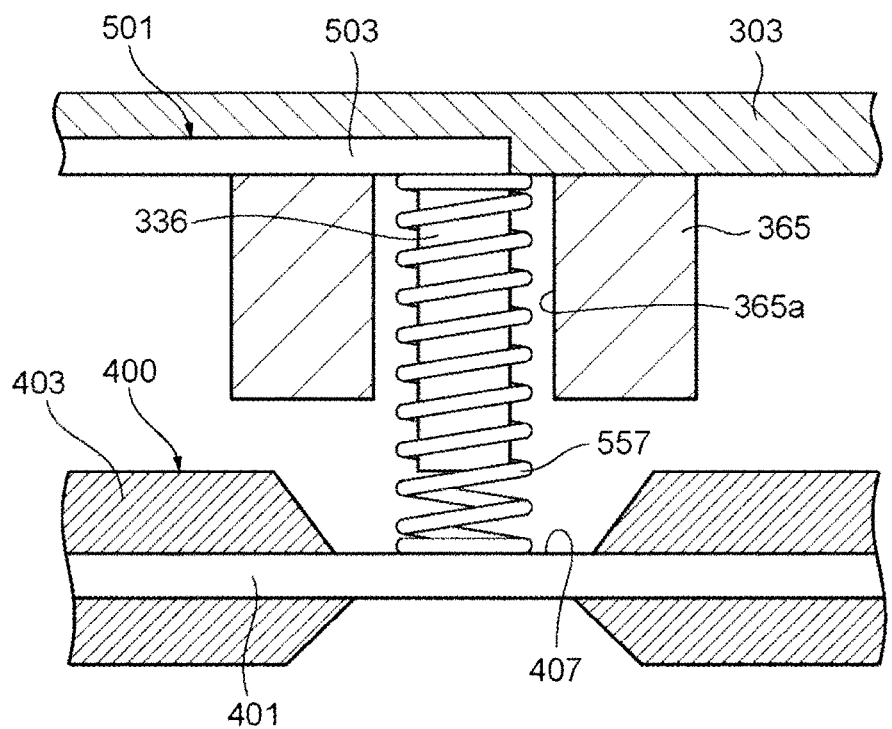
[Fig. 14C]

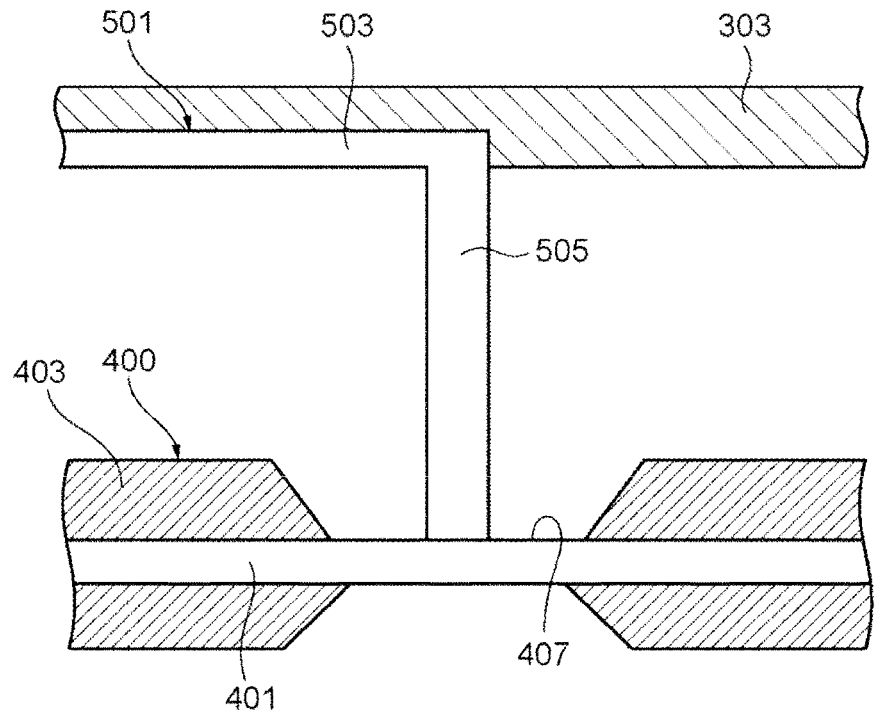
[Fig. 14D]
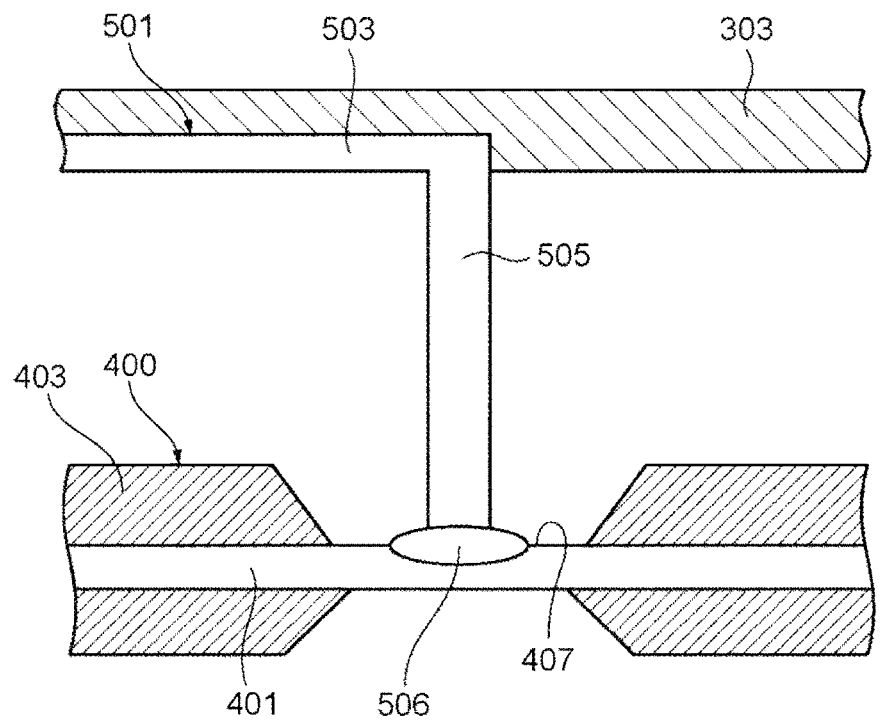
[Fig. 14E]

[Fig. 14F]
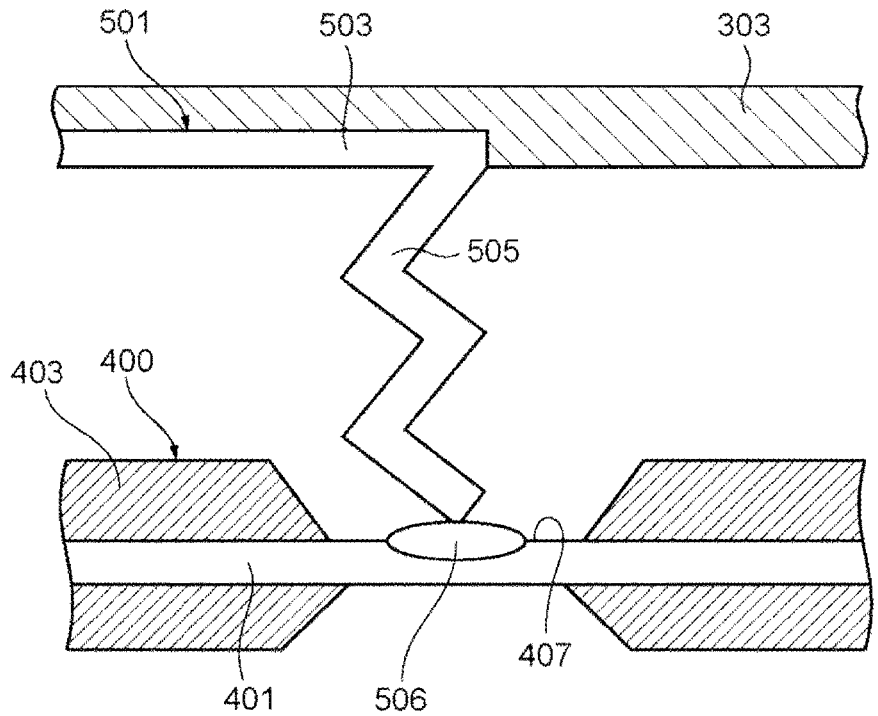
[Fig. 15]
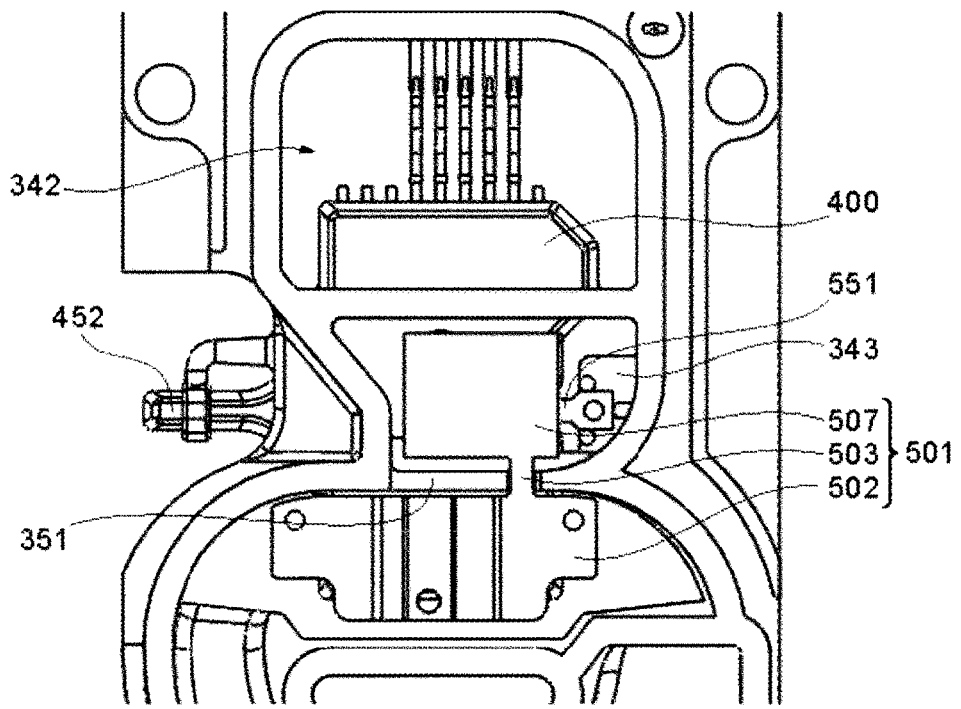

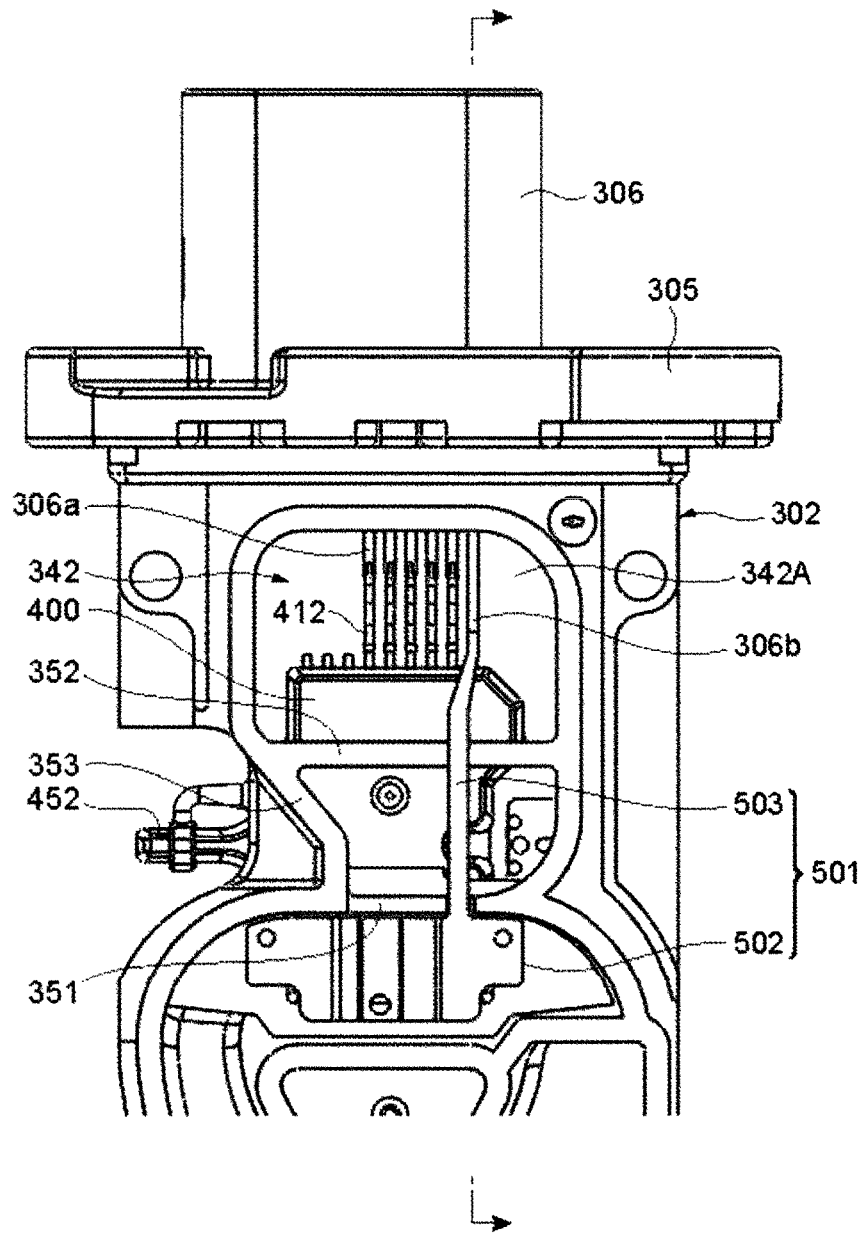
[Fig. 16A]

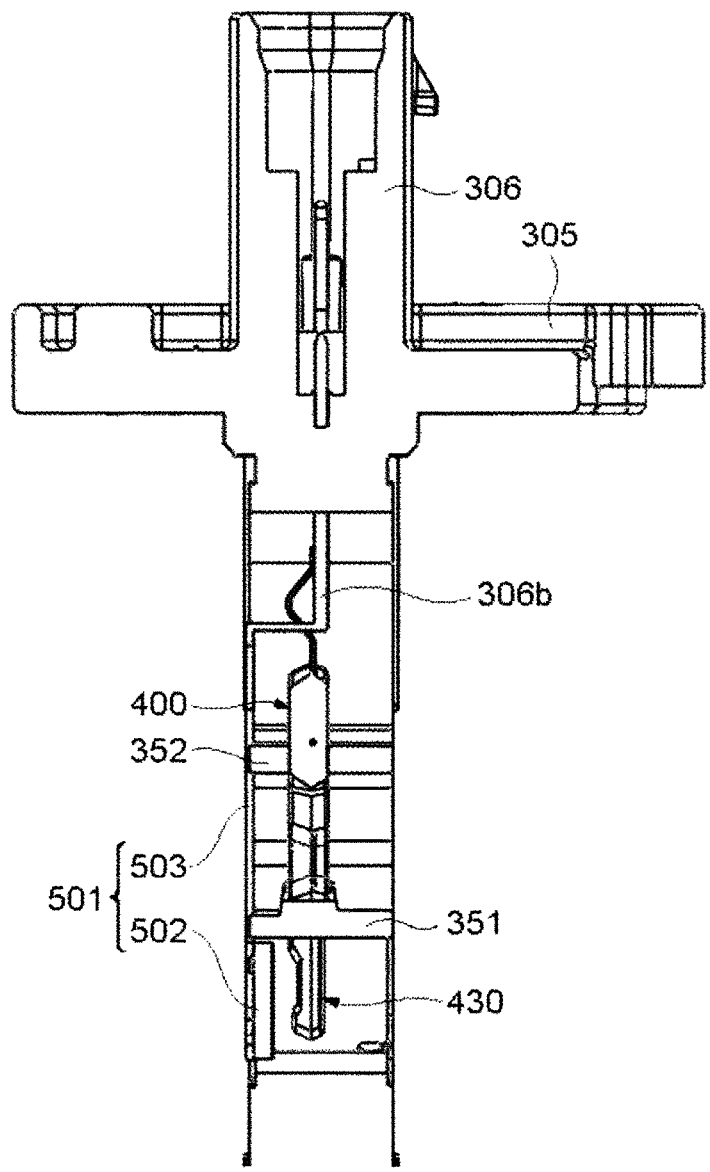
[Fig. 16B]

[Fig. 17]
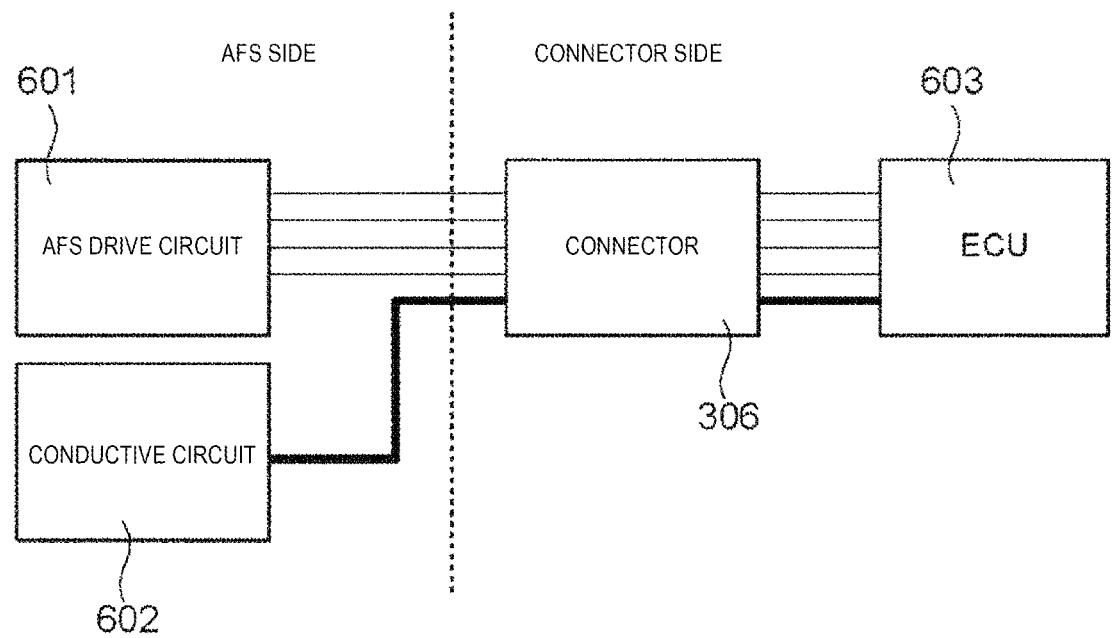

FLOW METER

TECHNICAL FIELD

The invention relates to a flowmeter.

BACKGROUND ART

As a flowmeter for measuring the mass flow rate of a measurement target gas flowing in a main path, there is a thermal type flowmeter. Such a flowmeter is configured such that a portion of a measurement target gas flowing in a pipe, which is a main path, is taken into a sub path and is guided to a flow rate measurement unit. In the flow rate measurement unit, a hot wire, a silicon element, or the like is disposed and the mass flow rate in the pipe is measured by using a fact that the hot wire, the silicon element, or the like is cooled by an air stream and the electrical resistivity changes.

In PTL 1, a technique of an thermal type flowmeter, in which a static electricity dissipation region is provided in a bypass path and electric charge of the corrupting substance is eliminated in viewpoint of a countermeasure against corruption for preventing a corrupting substance from adhering to the flow rate measurement unit, is proposed (PTL 1).

CITATION LIST

Patent Literature

PTL 1: US2013/061684

SUMMARY OF INVENTION

Technical Problem

Meanwhile, in recent years, there is proposed a structure of a thermal type flowmeter having a structure in which a circuit package is installed in a housing, the circuit package being formed by molding a lead frame and a circuit component with resin.

In the case of the circuit package, since the lead frame and the circuit component are embedded in a resin material, it is difficult to establish electrical connection with a conductor exposed in a place through which the measurement target gas passes.

The invention has been made in consideration of the above-described point and an object thereof is to obtain a flowmeter with which it is possible to easily establish electrical connection with a conductor exposed in a place through which a measurement target gas passes.

Solution to Problem

A flowmeter according to the invention for solving the above-described problem includes a package that includes a lead and a circuit component installed on the lead, a portion of the lead being molded with resin. The package is provided with an exposure portion which is electrically connected to a conductor constituting a portion of a sub path with a portion of the lead exposed out of the resin material.

Advantageous Effects of Invention

According to the invention, since the package is provided with the exposure portion, it is possible to easily connect the conductor to the package. Note that, a problem, a configuration, and an effect other than those described above will be apparent in description of an embodiment below.

BRIEF DESCRIPTION OF DRAWINGS

FIG. 1 is a system diagram illustrating an example where a thermal type flowmeter according to the invention is used in an internal combustion engine control system.

FIG. 2A is a front view illustrating the external appearance of the thermal type flowmeter according to the invention.

FIG. 2B is a left side view illustrating the external appearance of the thermal type flowmeter according to the invention.

FIG. 2C is a rear view illustrating the external appearance of the thermal type flowmeter according to the invention.

FIG. 2D is a right side view illustrating the external appearance of the thermal type flowmeter according to the invention.

FIG. 3A is a front view illustrating the state of a housing with a front cover and a rear cover removed from the thermal type flowmeter according to the invention.

FIG. 3B is a rear view illustrating the state of the housing with the front cover and the rear cover removed from the thermal type flowmeter according to the invention.

FIG. 4A is a view illustrating a facing surface of the front cover.

FIG. 4B is a sectional view taken along line IVB-IVB in FIG. 4A.

FIG. 5A is a view illustrating a facing surface of the rear cover.

FIG. 5B is a sectional view taken along line VB-VB in FIG. 5A.

FIG. 6A is a sectional view taken along line VIA-VIA in FIG. 2A.

FIG. 6B is an enlarged view of VIB in FIG. 6A.

FIG. 6C is a sectional view taken along line VIC-VIC in FIG. 2A.

FIG. 6D is a sectional view taken along line VID-VID in FIG. 2A.

FIG. 7 is a view for describing a method of connecting a lead frame and a conductor.

FIG. 8 is a view illustrating a front surface of a circuit package.

FIG. 9 is a view illustrating a specific configuration example of the lead frame.

FIG. 10A is a schematic view illustrating another configuration example in which an exposure portion and the conductor are connected to each other.

FIG. 10B is a schematic view illustrating another configuration example in which the exposure portion and the conductor are connected to each other.

FIG. 10C is a schematic view illustrating another configuration example in which the exposure portion and the conductor are connected to each other.

FIG. 10D is a schematic view illustrating another configuration example in which the exposure portion and the conductor are connected to each other.

FIG. 10E is a schematic view illustrating another configuration example in which the exposure portion and the conductor are connected to each other.

FIG. 10F is a schematic view illustrating another configuration example in which the exposure portion and the conductor are connected to each other.

FIG. 11 is a diagram conceptually illustrating a configuration of a thermal type flowmeter of Example 1.

FIG. 12 is a view for describing another configuration example in which the conductor is connected and fixed.

FIG. 13A is a front view illustrating a main portion of the thermal type flowmeter in an enlarged manner.

FIG. 13B is a view schematically illustrating a specific example of a configuration for holding an intermediate member.

FIG. 13C is a view schematically illustrating a specific example of the configuration for holding the intermediate member.

FIG. 13D is a view schematically illustrating a specific example of the configuration for holding the intermediate member.

FIG. 13E is a view schematically illustrating a specific example of the configuration for holding the intermediate member.

FIG. 14A is a view for describing a configuration example of a method of connecting the exposure portion and the conductor.

FIG. 14B is a view for describing a configuration example of a method of connecting the exposure portion and the conductor.

FIG. 14C is a view for describing a configuration example of a method of connecting the exposure portion and the conductor.

FIG. 14D is a view for describing a configuration example of a method of connecting the exposure portion and the conductor.

FIG. 14E is a view for describing a configuration example of a method of connecting the exposure portion and the conductor.

FIG. 14F is a view for describing a configuration example of a method of connecting the exposure portion and the conductor.

FIG. 15 is a view for describing another configuration example of the conductor.

FIG. 16A is a view for describing a configuration of a conductor in Example 2.

FIG. 16B is a view for describing the configuration of the conductor in Example 2.

FIG. 17 is a view for describing a configuration of a conductive circuit in Example 2.

DESCRIPTION OF EMBODIMENTS

Next, an embodiment of the invention will be described by using drawings.

FIG. 1 is a system diagram illustrating an example where a thermal type flowmeter according to the invention is used in an electronic fuel injection type internal combustion engine control system. Based on the motion of an internal combustion engine 110 provided with an engine cylinder 112 and an engine piston 114, an inhaled air as a measurement target gas 30 is inhaled from an air cleaner 122 and the inhaled air is guided to a combustion chamber of the engine cylinder 112 via, for example, an intake pipe which is a main path 124, a throttle body 126, and an intake manifold 128. The flow rate of the measurement target gas 30, which is the inhaled air guided to the combustion chamber, is measured by a thermal type flowmeter 300 according to the invention, fuel is supplied from a fuel injection valve 152 based on the measured flow rate, and the fuel is guided to the combustion chamber in a state of being an air-fuel mixture together with the measurement target gas 30, which is the inhaled air. Note that, in the present example, the fuel injection valve 152 is provided in an intake port of the internal combustion engine and fuel injected into the intake port forms the air-fuel mixture together with the measurement target gas 30, which is the inhaled air, is guided to the combustion chamber via an intake valve 116, and is burned such that mechanical energy is generated.

The fuel and air guided to the combustion chamber are in an air-fuel mixed state and are subject to explosive combustion due to spark-ignition of an ignition plug 154 such that mechanical energy is generated. Gas after the combustion is guided to an exhaust pipe from an exhaust valve 118 and is discharged as an exhaust gas 24, to the outside of a vehicle from the exhaust pipe. The flow rate of the measurement target gas 30, which is the inhaled air guided to the combustion chamber, is controlled by a throttle valve 132 of which the openness changes based on an operation on an accelerator pedal. The amount of fuel supply is controlled based on the flow rate of the inhaled air guided to the combustion chamber and a driver can control mechanical energy generated by the internal combustion engine by controlling the flow rate of the inhaled air guided to the combustion chamber by controlling the openness of the throttle valve 132.

The flow rate and the temperature of the measurement target gas 30, which is the inhaled air that is taken in via the air cleaner 122 and flows in the main path 124, are measured by the thermal type flowmeter 300 and an electric signal indicating the flow rate and the temperature of the inhaled air from the thermal type flowmeter 300 is input to a control device 200. In addition, output from a throttle angle sensor 144 that measures the openness of the throttle valve 132 is input to the control device 200, and output from a rotation angle sensor 146 is input to the control device 200 in order to measure the position and the state of the engine piston 114, the intake valve 116, or the exhaust valve 118 of the internal combustion engine and the rotation speed of the internal combustion engine. In order to measure the state of a mixture ratio between the amount of fuel and the amount of air from the state of the exhaust gas 24, output from an oxygen sensor 148 is input to the control device 200.

The control device 200 calculates the amount of fuel injection and the timing of ignition based on the flow rate of the inhaled air, which is output from the thermal type flowmeter 300, and the rotation speed of the internal combustion engine measured based on the output from the rotation angle sensor 146. Based on the result of the calculation, the amount of fuel supplied from the fuel injection valve 152 and the timing of ignition at which ignition is performed by the ignition plug 154 are controlled. Actually, the amount of fuel supply and the timing of ignition are finely controlled based on the state of change in intake temperature measured by the thermal type flowmeter 300 or throttle angle, the state of change in engine rotation speed, and the state of an air-fuel ratio measured by the oxygen sensor 148 in addition to the above-described factors. Furthermore, the control device 200 controls the amount of air bypassing the throttle valve 132 by using an idle air control valve 156 in an idle operation state of the internal combustion engine and controls the rotation speed of the internal combustion engine in the idle operation state.

FIG. 2 illustrates the external appearance of the thermal type flowmeter 300. FIG. 2A is a front view of the thermal type flowmeter 300, FIG. 2B is a left side view, FIG. 2C is a rear view, and FIG. 2D is a right side view. The thermal type flowmeter 300 is provided with a housing 302. The housing 302 is inserted into the intake pipe and is disposed in the main path 124 (refer to FIG. 1). A base end portion of the housing 302 is provided with a flange 305 for fixation to the intake pipe and a connector (external connection portion) 306 which is exposed to the outside of the intake pipe.

The housing 302 is supported in a cantilever manner with the flange 305 being fixed to the intake pipe and is disposed along a direction perpendicular to a main flowing direction of the measurement target gas flowing in the main path 124. The housing 302 is provided with a sub path for taking in the measurement target gas 30 flowing in the main path 124 and a flow rate measurement unit 451 for measuring the flow rate of the measurement target gas 30 is disposed in the sub path.

At a position that is close to a tip end of the housing 302 and is on an upstream side in the main flowing direction, an inlet 311 for taking a portion of the measurement target gas 30 such as the inhaled air into the sub path is provided. Furthermore, at positions that are close to the tip end and are on a downstream side in the main flowing direction, a first outlet 312 and a second outlet 313 for returning the measurement target gas 30 from the sub path to the main path 124 are provided. The first outlet 312 and the second outlet 313 are disposed to be laterally arranged in a thickness direction of the housing 302 as illustrated in FIG. 2D.

Since the inlet 311 is provided close to the tip end of the housing 302, a gas in a portion close to the central portion, which is separated from an inner wall surface of the main path, can be taken into the sub path. Accordingly, influence of the temperature of the inner wall surface of the main path is suppressed and thus it is possible to suppress a decrease in measurement accuracy of the flow rate or the temperature of a gas.

In the vicinity of the inner wall surface of the main path, fluid resistance is great and the flow speed is lower than an average flow speed in the main path. However, in the thermal type flowmeter 300 in the present example, since the inlet 311 is provided close to the tip end of the thin and long housing 302 which extends toward the center of the main path from the flange 305, it is possible to take a gas in the central portion of the main path, of which the flow speed is high, into the sub path. In addition, since the first outlet 312 and the second outlet 313 of the sub path are also provided close to the tip end of the housing 302, it is possible to return a gas flowing in the sub path to the central portion of the main path, in which the flow speed is high.

The housing 302 has a shape of which side surfaces are narrow (a thin shape) although a front surface thereof is an approximately rectangular wide surface. Front and rear surfaces of the housing 302 are disposed along the main flowing direction of the measurement target gas flowing in the main path and side surfaces are disposed to face each other in the main flowing direction. Accordingly, the thermal type flowmeter 300 can be provided with a sub path having a sufficient length while reducing fluid resistance with respect to the measurement target gas 30.

That is, regarding the thermal type flowmeter in the present example, the shape of the housing projected onto an orthogonal plane orthogonal to a flowing direction of the measurement target gas 30 flowing in the main path 124 has a length dimension that is defined on the orthogonal plane in a first direction 50 and a thickness dimension that is defined on the orthogonal plane in a second direction 51 that is perpendicular to the first direction 50 (refer to FIG. 2B), the thickness dimension being smaller than the length dimension.

The housing 302 is provided with a temperature measurement unit 452 for measuring the temperature of the measurement target gas 30. The housing 302 has a shape that is recessed toward the downstream side at a position that is in the central portion in a longitudinal direction and is on the upstream side in the main flowing direction of the measurement target gas and the temperature measurement unit 452 is provided in the recessed position. The temperature measurement unit 452 has a shape that protrudes toward the upstream side in the main flowing direction from an upstream side outer wall of the housing 302.

FIG. 3 illustrates the state of the housing 302 with a front cover 303 and a rear cover 304 being removed from the thermal type flowmeter 300. FIG. 3A is a front view of the housing 302 and FIG. 3B is a rear view.

In the housing 302, a circuit package 400 provided with the flow rate measurement unit 451 for measuring the flow rate of the measurement target gas 30 flowing in the main path 124 or the temperature measurement unit 452 for measuring the temperature of the measurement target gas 30 flowing in the main path 124 is integrally formed through molding (refer to FIG. 3A).

Furthermore, in the housing 302, sub path grooves constituting a sub path 307 are formed. In the present example, the sub path grooves are provided on both of front and rear surfaces of the housing 302 and the sub path 307 is completed when the front and rear surfaces of the housing 302 are covered with the front cover 303 and the rear cover 304. According to this configuration, it is possible to mold the entire housing 302 with both of a front side sub path groove 321 and a rear side sub path groove 331 being molded as a portion of the housing 302 by using molds provided on opposite surfaces of the housing 302 at the time of molding of the housing 302 (resin molding process).

The sub path groove is configured with the rear side sub path groove 331 formed on the rear surface of the housing 302 and the front side sub path groove 321 formed on the front surface of the housing 302. The rear side sub path groove 331 is provided with a first groove portion 332 and a second groove portion 333 that branches off from an intermediate portion of the first groove portion 332.

The first groove portion 332 linearly extends along the main flowing direction of the measurement target gas 30 at a tip end portion of the housing 302, one end of the first groove portion 332 communicates with the inlet 311 of the housing 302, and the other end of the first groove portion 332 communicates with the outlet 312 of the housing 302. The first groove portion 332 is provided with a linear portion 332A that has an approximately constant sectional shape and extends from the inlet 311 and a throttle portion 332B of which the groove width becomes gradually narrower toward the outlet 312 from the linear portion 332A.

The linear portion 332A of the first groove portion 332 is provided with a plurality of linear projection portions 335. The linear projection portions 335 are provided on a bottom wall surface 332b of the linear portion 332A such that the plurality of linear projection portions 335 are arranged at predetermined intervals in a groove width direction of the first groove portion 332 and the linear projection portions 335 extend along the linear portion 332A over an area from the inlet 311 to the throttle portion 332B. Each linear projection portion 335 has a trapezoid-shaped section and opposite side surfaces thereof are obliquely inclined. Therefore, in a case where a water droplet adheres, it is possible to lower the height of the water droplet by increasing a contact angle with respect to the water droplet and it is possible to cause the water droplet to quickly flow toward the downstream side from the upstream side by increasing a wettability. Accordingly, in a case where a water droplet adheres to the first groove portion 332, it is possible to effectively prevent the water droplet from flowing into the second groove portion 333 from the first groove portion 332 and it is possible to quickly discharge the water droplet to the outside.

The second groove portion 333 branches off from the linear portion 332A of the first groove portion 332, extends toward the base end of the housing 302 while being curved, and communicates with a measurement flow path 341 provided in the central portion of the housing 302 in the longitudinal direction. An upstream end of the second groove portion 333 communicates with a side wall surface 332a, which is positioned close to the base end of the housing 302 and is one of a pair of side wall surfaces constituting the first groove portion 332, and a bottom wall surface 333a is connected to the bottom wall surface 332b of the linear portion 332A of the first groove portion 332 such that the bottom wall surface 333a becomes flush with the bottom wall surface 332b.

A level difference portion 334 is provided along a boundary portion between the bottom wall surface 332b of the first groove portion 332 of the housing 302 and the bottom wall surface 333a of the second groove portion 333. The level difference portion 334 is formed on a line that linearly connects an intersection point between the side wall surface 332a of the first groove portion 332 and a side wall surface 333b of the second groove portion 333, which is on an inner circumferential side, to an intersection point between the side wall surface 332a of the first groove portion 332 and a side wall surface 333c of the second groove portion 333, which is on an outer circumferential side.

In a case where a water droplet adhering to the bottom wall surface 332b of the linear portion 332A of the first groove portion 332 flows by being pressed by the measurement target gas 30 and moves toward the second groove portion 333, the level difference portion 334 can hold back the water droplet by means of the level difference portion 334 and can prevent the water droplet from flowing to the bottom wall surface 333a of the second groove portion 333 from the bottom wall surface 332b of the first groove portion 332. Accordingly, it is possible to prevent the water droplet from infiltrating into the second groove portion 333 from the first groove portion 332 via a path wall surface and it is possible to protect the flow rate measurement unit 451 from water.

As with the linear projection portions 335, the level difference portion 334 has a trapezoid-shaped section and opposite side surfaces thereof are obliquely inclined. Therefore, in a case where a water droplet adheres, it is possible to lower the height of the water droplet by increasing a contact angle with respect to the water droplet and it is possible to cause the water droplet to quickly flow toward the downstream side from the upstream side by increasing a wettability. Accordingly, in a case where a water droplet adheres to the level difference portion 334, it is possible to effectively prevent the water droplet from flowing into the second groove portion 333 from the first groove portion 332 and it is possible to quickly discharge the water droplet to the outside from the first groove portion 332.

The side wall surface 333b of the second groove portion 333, which is on the inner side of a curve, is provided with a recess Portion 333e and thus water infiltrating into the second groove portion 333 can be drawn into the recess portion 333e and can be discharged to the outside via a drain hole 376 (refer to FIG. 2C) that is drilled in the rear cover 304 while being positioned to face the recess portion 333e.

The measurement flow path 341 is formed to penetrate the housing 302 from a front side to a rear side in the thickness direction and a flow path exposure portion 430 of the circuit package 400 is disposed to protrude. The second groove portion 333 communicates with the measurement flow path 341 at a position on an upstream side of the flow path exposure portion 430 of the circuit package 400 in the sub path.

The second groove portion 333 has a shape such that the groove depth thereof becomes greater toward the measurement flow path 341 and particularly, the second groove portion 333 is provided with a steep inclined portion 333d of which the depth suddenly increases in front of the measurement flow path 341. The steep inclined portion 333d allows a gas in the measurement target gas 30 to proceed to a front surface 431 side, which is one of the front surface 431 and a rear surface 432 of the flow path exposure portion 430 of the circuit package 400 in the measurement flow path 341 and on which the flow rate measurement unit 451 is provided, and allows a foreign substance such as dust included in the measurement target gas 30 to proceed to the rear surface 432 side.

The measurement target gas 30 gradually moves in a direction toward a front side (back side of FIG. 3B) of the housing 302 as the measurement target gas 30 flows inside the rear side sub path Groove 331. Furthermore, a portion of air, which is small in mass, moves along the steep inclined portion 333d and flows toward the front surface 431 (refer to FIG. 3A) of the flow path exposure portion 430 in the measurement flow path 341. Meanwhile, since it is difficult for the foreign substance, which is large in mass, to suddenly change the course due to a centrifugal force, the foreign substance cannot flow along the steep inclined portion 333d and flows to the rear surface 432 (refer to FIG. 3B) of the flow path exposure portion 430 in the measurement flow path 341.

The flow rate measurement unit 451 is provided on the front surface 431 of the flow path exposure portion 430 of the circuit package 400. In the flow rate measurement unit 451, heat is transmitted from the measurement target gas 30 flowing to the front surface 431 of the flow path exposure portion 430 via a heat transmission surface and the flow rate is measured.

When the measurement target gas 30 passes by the front surface 431 side and the rear surface 432 side of the flow path exposure portion 430 of the circuit package 400, the measurement target gas 30 flows into the front side sub path groove 321 from a sub path downstream side portion of the measurement flow path 341, and flows inside the front side sub path groove 321, and is discharged to the main path 124 from the second outlet 313.

As illustrated in FIG. 3A, one end of the front side sub path groove 321 communicates with the sub path downstream side portion of the measurement flow path 341 and the other end of the front side sub path groove 321 communicates with the outlet 313 formed close to the tip end of the housing 302. The front side sub path groove 321 has a shape that is curved such that the front side sub path groove 321 gradually becomes closer to the downstream side in the main flowing direction toward the tip end of the housing 302, linearly extends toward the downstream side in the main flowing direction of the measurement target gas 30 at the tip end portion of the housing 302, and the groove width thereof gradually becomes smaller toward the second outlet 313.

In this example, a flow path configured with the rear side sub path groove 331 extends from the tip end of the housing 302 to the base end side, which is the flange 305 side, while describing a curve, the measurement target gas 30 flowing in the sub path 307 flows in a direction opposite to the main flowing direction in the main path 124 at a position closest to the flange 305, and the rear side sub path, which is provided on the rear surface side of the housing 302, is connected to the front side sub path, which is provided on the front surface side, at a portion in which the measurement target gas flows in the direction opposite to the main flowing direction.

The measurement flow path 341 is divided into a space on the front surface 431 side and a space on the rear surface 432 side by the flow path exposure portion 430 of the circuit package 400 and is not divided by the housing 302. That is, the measurement flow path 341 is formed to penetrate the front and rear surfaces of the housing 302 and the circuit package 400 is disposed in the one space to protrude in a cantilever manner. According to this configuration, it is possible to mold the sub path grooves on both of front and rear surfaces of the housing 302 through one resin molding process and it is possible to mold a structure that connecting the sub path grooves on both surfaces at the same time. Note that, the circuit package 400 is fixed while being embedded in fixation portions 351, 352, and 353 of the housing 302 through resin molding.

In addition, according to the above-described configuration, it is possible to insert and mount the circuit package 400 in the housing 302 at the same time as when forming the housing 302 through resin molding. Note that, it is also possible to form the shape of a sub path connecting the rear side sub path groove 331 and the front side sub path groove 321 to each other through one resin molding process by configuring any one of a path upstream side, which is on the upstream side of the circuit package 400, and a path downstream side, which is on the downstream side, to be penetrated in a width direction of the housing 302.

When the front side sub path groove 321 is closed by the front cover 303, the front side sub path of the housing 302 is formed and a side wall upper end portion of each of a pair of side wall surfaces constituting the front side sub path groove 321, which is on the upper side in a groove height direction, comes into close contact with a facing surface of the front cover 303. Furthermore, when the rear side sub path groove 331 closed by the rear cover 304, the rear side sub path of the housing 302 is formed and a side wall upper end portion of each of a pair of side wall surfaces constituting the rear side sub path groove 331, which is on the upper side in the groove height direction, comes into close contact with a facing surface of the rear cover 304.

As illustrated in FIGS. 3A and 3B, in the housing 302, a cavity portion 342, which becomes a circuit chamber, is formed between the flange 305 and a portion in which the sub path grooves are formed. The cavity portion 342 is formed by penetrating the housing 302 in the thickness direction and in the present example, the cavity portion 342 is divided into two parts of a cavity portion 342A on the flange side and a cavity portion 342B on the sub path side by the fixation portion 352 of the housing 302.

In the cavity portion 342A, outer leads (connection terminal) 412 of the circuit package 400 and an inner end 306a of an external terminal of a connector 306 are electrically connected to each other via spot welding, laser welding, or the like. The cavity portion 342B is provided with a conductive intermediate member 551. When the front cover 303 is attached to the housing 302, the intermediate member 551 is interposed between a conductor 501 of the front cover 303 and a lead frame 401 of the circuit package 400 and electrically connects the conductor 501 and the lead frame 401 to each other. The cavity portion 342 is closed when the front cover 303 and the rear cover 304 are attached to the housing 302 and the vicinity of the cavity portion 342 is sealed by being laser-welded to the front cover 303 and the rear cover 304.

FIG. 4 is a view for describing a configuration of the front cover and FIG. 5 is a view for describing a configuration of the rear cover. FIG. 4A is a view illustrating a facing surface of the front cover and FIG. 4B is a sectional view taken along line B-B in FIG. 4A. FIG. 5A is a view illustrating a facing surface of the rear cover and FIG. 5B is a view illustrating a side surface of the rear cover.

The front cover 303 or the rear cover 304 has a thin plate-like shape and has a shape provided with a wide cooling surface. Therefore, the thermal type flowmeter 300 has an effect that air resistance is reduced and the thermal type flowmeter 300 is likely to be cooled by the measurement target gas flowing in the main path 124.

The front cover 303 has a size such that the front cover 303 covers the front surface of the housing 302. On the facing surface of the front cover 303, a fifth region 361 that closes the front side sub path groove 321 of the housing 302, a sixth region 362 that closes a front side of the measurement flow path 341 of the housing 302, and a seventh region 363 that closes a front side of the cavity portion 342 are formed. The seventh region 363 is provided with a region 363A that closes the cavity portion 342A, which is a portion of the cavity portion 342 and is close to the flange 305 of the housing 302, and a region 363B that closes the cavity portion 342B which is on the sub path side.

Furthermore, a recess portion 361a into which side wall upper end portions of the front side sub path groove 321 of the housing 302 are inserted is provided around the peripheral portions of the fifth region 361 and the sixth region 362. In addition, a recess portion 363a into which a front side outer circumferential end portion of the cavity portion 342 is inserted provided around the peripheral portion of the seventh region 363. Furthermore, on the facing surface of the front cover 303, a projection portion 362a which is inserted into a gap between a tip end of the flow path exposure portion 430 of the circuit package 400 and the measurement flow path 341 of the housing 302 is provided.

The front cover 303 is laser-welded to the side wall upper end portions of the front side sub path groove 321 of the housing 302 inserted into the recess portion 361a with the facing surface of the front cover 303 facing the front surface of the housing 302 and the front cover 303 is laser-welded to the peripheral portion of the cavity portion 342 of the housing 302 inserted into the recess portion 363a such that the front cover 303 is tightly fixed to the housing 302.

The front cover 303 is provided with the conductor 501. The conductor 501 is provided to remove electricity such that the foreign substance such as dust included in the measurement target gas is prevented from adhering the flow rate measurement unit 451 or the vicinity thereof while being electrically charged and is formed of, for example, a conductive metal plate or conductive metal foil formed of iron, aluminum alloy, copper, copper alloy, stainless steel, or nickel. In the present example, the conductor 501 is insert-molded into the front cover 303.

The conductor 501 is provided with a flat plate portion 502 that is disposed in the sixth region 362 of the front cover 303 and an arm portion 503 which protrudes from the flat plate portion 502 and of which a tip end is disposed in the seventh region 363. The flat plate portion 502 is disposed on the facing surface of the front cover 303 with at least a portion thereof exposed and is positioned to face at least the flow rate measurement unit 451 on the front surface 431 of the flow path exposure portion 430 of the circuit package 400 in the measurement flow path 341 of the housing 302. The flat plate portion 502 has a projecting shape, of which the central portion in the flowing direction of the measurement target gas 30 protrudes like a mountain, such that the flow speed of the measurement target gas 30 passing through a space between the flat plate portion 502 and the flow rate measurement unit 451 is increased. The arm portion 503 is provided with a claw portion 504 that protrudes with a tip end thereof folded. The claw portion 504 abuts onto a tip end of the intermediate member 551 in a state where the front cover 303 is attached to the housing 302.

The rear cover 304 has a size such that the rear cover 304 covers the rear surface of the housing 302. On the facing surface of the rear cover 304, a first region 371A that closes the first groove portion 332 of the rear side sub path groove 331 of the housing 302, a second region 371B that closes the second groove portion 333, a third region 372 that closes a rear side of the measurement flow path 341 of the housing 302, and a fourth region 373 that closes a rear side of the cavity portion 342 are formed. The fourth region 373 is provided with a region 373A that closes the cavity portion 342A of the cavity portion 342 which is close to the flange 305 of the housing 302 and a region 373B that closes the cavity portion 342B of the cavity portion 342 which is on the sub path side. Furthermore, a recess portion 371a into which side wall upper end portions of the rear side sub path groove 331 of the housing 302 are inserted is provided around the peripheral portions of the first region 371A, the second region 371B, and the third region 372. In addition, a recess portion 373a into which a rear side outer circumferential end portion of the cavity portion 342 is inserted is provided around the peripheral portion of the fourth region 373.

The first region 371A of the rear cover 304 is provided with a plurality of linear projection portions 377. The linear projection portions 377 extend along a longitudinal direction of the first region 371A and are provided such that the plurality of linear projection portions 377 are arranged at predetermined intervals in a transverse direction. Each linear projection portion 377 has the same section as a level difference portion 375, which is a trapezoid-shaped section, and opposite side surfaces thereof are obliquely inclined. Therefore, in a case where a water droplet adheres, it is possible to lower the height of the water droplet by increasing a contact angle with respect to the water droplet and it is possible to cause the adhering water droplet to quickly flow toward the downstream side from the upstream side by increasing a wettability. Accordingly, it is possible to effectively prevent the water droplet from flowing into the second region 371B from the first region 371A and it is possible to quickly discharge the water droplet to the outside.

The drain hole 376 that communicates with the sub path 307 is drilled in the rear cover 304. The drain hole 376 is formed to penetrate at a position that closes the recess portion 333e of the housing 302 in a state where the rear cover 304 is attached to the housing 302 and thus water drawn into the recess portion 333e of the second groove portion 333 can be discharged to the outside of the housing 302.

On the facing surface of the rear cover 304, a projection portion 372a which is inserted into the gap between the tip end of the flow path exposure portion 430 of the circuit package 400 and the measurement flow path 341 of the housing 302 is provided. The projection portion 372a fills the gap between the tip end of the flow path exposure portion 430 of the circuit package 400 and the measurement flow path 341 of the housing 302 in cooperation with the projection portion 362a of the front cover 303.

The front cover 303 and the rear cover 304 are respectively attached to the front surface and the rear surface of the housing 302 and form the sub path 307 in cooperation with the front side sub path groove 321 and the rear side sub path groove 331. The sub path 307 is provided with a first path that linearly extends from the inlet 311 to the first outlet 312 and a second path that branches off from an intermediate portion of the first path and extends toward the flow rate measurement unit 451 while being curved. The conductor 501 provided on the front cover 303 is conductively connected to the lead frame 401 of the circuit package 400 via the intermediate member 551 when the front cover 303 is attached to the housing 302. Accordingly, it is possible to configure a conductive circuit in which the conductor 501 is connected to the ground and it is possible to remove electricity of the flow rate measurement unit 451 in the sub path 307 which is a place where the conductor 501 is disposed and through which the measurement target gas 30 passes or a component in the vicinity of the flow rate measurement unit 451. Accordingly, it is possible to prevent a foreign substance such as fine particles included in the measurement target gas 30 from firmly adhering to the flow rate measurement unit 451 or the like while being electrically charged and to prevent deterioration in measurement performance due to corruption.

FIG. 6A is a sectional view taken along line VIA-VIA in FIG. 2A, FIG. 6B is an enlarged view of VIB in FIG. 6A, FIG. 6C is a sectional view taken along line VIC-VIC in FIG. 2A, and FIG. 6D is a sectional view taken along line VID-VID in FIG. 2A.

The circuit package 400 is configured by integrally molding the lead frame 401 and circuit components installed into the lead frame 401 by using a thermosetting resin material 403. In the present example, as the circuit components, as illustrated in FIG. 9, an LSI 453, a capacitor chip 454, and a sensor element of the flow rate measurement unit 451 or the temperature measurement unit 452 are installed in the lead frame 401.

As illustrated in FIG. 8, the circuit package 400 has a vertically long flat plate-like shape and when the circuit package 400 is molded into the housing 302, the flow path exposure portion 430 protrudes inside the sub path 307 and the front surface 431 and the rear surface 432 of the flow path exposure portion 430 are disposed to be parallel with each other along the flowing direction of the measurement target gas 30 in the sub path 307. One long side portion of the circuit package 400 is provided with a protrusion portion 433 and a tip end of the protrusion portion 433 is provided with the temperature measurement unit 452. The protrusion portion 433 protrudes along a flat surface of the circuit package 400, penetrates an upstream side outer wall 317 of the housing 302, and is disposed at a position such that the temperature measurement unit 452 is exposed to the outside of the housing 302.

The other long side portion of the circuit package 400 is provided with an exposure portion 405 at which a portion of the lead frame 401 is exposed out of the resin material 403. The exposure portion 405 is configured by cutting the resin material 403 of an end portion of the circuit package 400 and is provided on front and rear surfaces of the lead frame 401. In the present example, the exposure portion 405 is formed by causing the lead frame 401 to be interposed between molds respectively abutting onto the front and rear surfaces of the lead frame 401 and preventing resin from flowing into the exposure portion 405 at the time of molding the circuit package 400 with the resin material 403.

The exposure portion 405 of the lead frame 401 is pressed by the conductor 501 via the intermediate member 551. The intermediate member 551 is formed of a conductive elastic member such as electroconductive rubber and abuts onto the exposure portion 405 of the lead frame 401. The intermediate member 551 is disposed in the cavity portion 342B of the housing 302 and electrically connects the exposure portion 405 of the lead frame 401 and the conductor 501 of the front cover 303 to each other. The intermediate member 551 is formed of an elastic body that can be elastically deformed in accordance with a change in distance between the conductor 501 and the exposure portion 405.

As illustrated in FIG. 6D, a base end of the intermediate member 551 is supported by a supporting portion 343 of the housing 302 and a tip end thereof is interposed between the exposure portion 405 of the lead frame 401 and the claw portion 504 of the conductor 501. Regarding the intermediate member 551, when the front cover 303 is attached to the housing 302, the tip end of the intermediate member 551 is interposed between the exposure portion 405 of the lead frame 401 and the claw portion 504 of the conductor 501 and is elastically deformed to press the exposure portion 405 of the lead frame 401 with a predetermined pressing force.

FIG. 7 is a view for describing a method of connecting the lead frame and the conductor. The supporting portion 343 of the housing 302 which supports the intermediate member 551 is provided to protrude in the cavity portion 342B of the housing 302 (refer to FIG. 7(1)). The supporting portion 343 is provided with a plurality of rod-shaped members that are erected toward the front surface side of the housing 302. The intermediate member 551 is pressed from the front surface side of the housing 302 to the supporting portion 343 along the axial direction of the rod-shaped members, the base end is inserted between the plurality of rod-shaped members, and the central rod-shaped member is fitted into a circular hole of the base end of the intermediate member 551 such that the intermediate member 551 is supported by the supporting portion 343 (refer to FIG. 7(2)).

Then, the front cover 303 is attached to the housing 302. In FIG. 7(3), the front cover 303 is not illustrated and only the conductor 501 provided on the front cover 303 is illustrated. Since the front cover 303 is attached, the intermediate member 551 abuts onto the claw portion 504 of the conductor 501, is pressed in the thickness direction of the housing 302, interposed between the claw portion 504 of the conductor 501 and the exposure portion 405 of the circuit package 400, and is held in a state of being elastically deformed in a pressing direction. Since the intermediate member 551 is formed of electroconductive rubber, the conductor 501 and the exposure portion 405 of the circuit package 400 can be electrically connected to each other.

It is possible to cause the intermediate member 551 to electrically connect the conductor 501 of the front cover 303 and the exposure portion 405 of the lead frame 401 to each other only by attaching the front cover 303 to the housing 302. Accordingly, it is possible to easily establish electric connection between the conductor 501 of the front cover 303 and the exposure portion 405 of the circuit package 400 and it is possible to prevent a foreign substance included in the measurement target gas 30 from adhering to the flow rate measurement unit 451 or the like while being electrically charged by removing electricity of the flow rate measurement unit 451 in the sub path 307 or a component in the vicinity of the flow rate measurement unit 451.

FIG. 9 is a view illustrating a specific configuration example of the lead frame.

The lead frame 401 is provided with a mounting portion 404 on which a circuit component such as the LSI 453 is mounted and the exposure portion 405 of which at least a portion is exposed out of the resin material 403 and which is pressed by the conductor 501 via the intermediate member 551. The exposure portion 405 is disposed to be adjacent to the mounting portion 404. The mounting portion 404 and the exposure portion 405 are connected to GND of the lead frame 401 and are connected to the inner end 306a of the external terminal of the connector 306 via the outer leads 412 from inner leads 411.

The lead frame 401 is configured such that the mounting portion 404 and the exposure portion 405 are separated from each other at least partially. In the present example, a slit 406 is provided between the mounting portion 404 and a pressed region 405a of the exposure portion 405 that is pressed via the intermediate member 551.

According to the present example, since the lead frame 401 is provided with the slit 406 and the mounting portion 404 of the lead frame 401 and the exposure portion 405 are separated from each other, it is possible to prevent a stress at a time when the pressed region 405a of the exposure portion 405 is pressed via the intermediate member 551 from acting on a mounting region of the mounting portion 404.

Regarding the circuit package 400, circuit wires are packaged and it is necessary that the circuit package 400 is provided with the exposure portion 405 at which the lead frame 401 is exposed in order to establish electric connection with the conductor 501. Since the exposure portion 405 of the lead frame 401 is formed by causing a portion of the lead frame 401 to be interposed between molds on upper and lower sides when forming the circuit package 400 through molding, the resin material 403 is not present on front and rear surfaces of the portion and the hardness of the portion is particularly lower than a nearby portion.

Accordingly, if there is no slit 406, there is a possibility that a stress acting on the exposure portion 405 is transmitted to the mounting portion 404 and characteristics of the LSI 453 installed in the mounting portion 404 or an element of the flow rate measurement unit 451 are changed in a case where the pressed region 405a of the exposure portion 405 of the lead frame 401 is pressed by the conductor 501 via the intermediate member 551.

However, in the present invention, the lead frame 401 is provided with the slit 406 and the mounting portion 404 of the lead frame 401 and the exposure portion 405 are separated from each other. Accordingly, it is possible to isolate a stress that acts on the exposure portion 405 in a case where the pressed region 405a of the exposure portion 405 of the lead frame 401 is pressed via the intermediate member 551 by using the slit 406 and to prevent the stress from being transmitted to the mounting portion 404 from the exposure portion 405 and thus it is possible to prevent characteristics of the circuit components such as the LSI 453 mounted on the mounting portion 404 from being influenced.

According to the present example, since the circuit package 400 is provided with the exposure portion 405 and the exposure portion 405 is electrically connected to the conductor 501 of the front cover 303, it is possible to easily connect the conductor 501 to the lead frame 401 in the circuit package 400. Accordingly, it is possible to remove electricity of the flow rate measurement unit 451 in the sub path 307 which is a place where the conductor is disposed and through which the measurement target gas passes or a component in the vicinity of the flow rate measurement unit 451 and thus it is possible to prevent a foreign substance such as fine particles included in the measurement target gas 30 from firmly adhering to the flow rate measurement unit 451 or the like while being electrically charged and to prevent deterioration in measurement performance due to corruption.

In the present example, an end portion of the circuit package 400 is provided with a U-shaped notch such that the exposure portion 405 is formed. Therefore, a wrinkle is not likely formed on a film that is interposed between the molds at the time of molding and it is easy to perform molding in comparison with a case where the circuit Package 400 is formed such that a surface thereof is provided with a circular hole-shaped recess. In addition, since it is possible to support the intermediate member 551, which abuts onto the exposure portion 405, at a position on a lateral side of the circuit package 400, it is not necessary that the circuit package 400 is provided with a side wall for protecting the intermediate member 551 and it is possible to prevent an increase in stress on the LSI 453 which is caused by the side wall.

FIGS. 10A to 10F are schematic views illustrating other configuration examples in which the exposure portion 405 and the conductor 501 are connected to each other. In a configuration example illustrated in FIG. 10A, a portion of an outer lead 413 that protrudes from an end portion of the circuit package 400 is folded into a bellows-like shape and is connected to the conductor 501. A folded portion 413a that is folded into a bellows-like shape abuts onto the arm portion 503 of the conductor 501 with a predetermined pressing force due to elastic deformation and is electrically connected to the arm portion 503. According to this configuration example, it is possible to omit the intermediate member 551 and thus it is possible to decrease the number of components and to simplify an assembly operation. In addition, it is possible to decrease the number of contact points and to decrease a possibility of poor contact.

In a configuration example illustrated in FIG. 10B, the intermediate member 551 is held while being stuck into the exposure portion 405 of the lead frame 401. A fitting hole, into which the intermediate member 551 is fitted such that the intermediate member 551 is held, is formed in the exposure portion 405 in advance. According to this configuration example, it is not necessary that the housing 302 is provided with the supporting portion 343 and it is possible to simplify the configuration of the housing 302.

In a configuration example illustrated in FIGS. 10C and 10D, a flat spring 552 is used as the intermediate member 551. The flat spring 552 is formed by folding a metal plate into a U-shape, a base end portion 552a is fixed to the supporting portion 343 of the housing 302, one end portion 552b abuts onto the exposure portion 405 with a predetermined pressing force due to elastic deformation, and the other end portion 552c abuts onto the arm portion 503 of the conductor 501 such that both components are electrically connected to each other. According to this configuration example, a pressing force on the exposure portion 405 and a pressing force on the conductor 501 can be set to be different from each other, each of the exposure Portion 405 and the conductor 501 can come into contact with the flat spring while being pressed with an appropriate pressing force, and it is possible to prevent an excessive force from acting on the LSI 453 or the like.

FIGS. 10E and 10F illustrate other configuration examples of the intermediate member. In the above-described example, the description has been made by using a case where the intermediate member 551 has a rectangular block-like shape as an example. However, the intermediate member 551 may have an O-like shape as illustrated in FIG. 10E or may have a shape in which a squashing projection portion is installed on an abutting surface as illustrated in FIG. 10F. An intermediate member 553 illustrated in FIG. 10E is provided with a space portion 553c between an upper surface 553a that abuts onto the arm portion 503 of the conductor 501 and a lower surface 553b that abuts onto the exposure portion 405 and the elastic force thereof can be adjusted by changing geometric settings of the space chamber 553c. The elastic force of an intermediate member 554 illustrated in FIG. 10F can be adjusted by changing the sizes or the shapes of a projection portion 554a that abuts onto the arm portion 503 of the conductor 501 and a projection portion 554b that abuts onto the exposure portion 405.

FIG. 11 is a diagram conceptually illustrating a configuration of the thermal type flowmeter of Example 1, and FIG. 12 is a view for describing another configuration example in which the conductor is connected and fixed. In the present example, the conductor 501 is configured through component bonding with respect to the sub path 307, is configured through contact connection with respect to the circuit component such as the LSI 453 of the circuit package 400, and is configured separately from the sub path 30 and the circuit component. For example, as another configuration example, the conductor may be connected to the exposure portion 405 of the circuit package 400 as illustrated in FIG. 12 such that an ASSY is obtained or, although not shown in the drawings, a conductive material may be over-molded with respect to the circuit package 400 such that an ASSY is obtained. Even in this case, the conductor 501 is configured separately from the sub path 307 and the circuit component.

FIGS. 13A to 13E are views for describing other configuration examples of the thermal type flowmeter, where FIG. 13A is a front view illustrating a main portion of the thermal type flowmeter in an enlarged manner and FIGS. 13B to 13E are views schematically illustrating specific examples of configurations for holding an intermediate member 555.

In this configuration example, an exposure portion 407 is formed by providing a circular hole-shaped recess on the front surface of the circuit package 400. The recess is provided on front and rear surfaces of the circuit package 400 and a portion of the lead frame 401 is exposed on a front surface side and a rear surface side. In addition, the intermediate member 555 is formed of electroconductive rubber as with the intermediate member 551 and has a columnar shape.

As illustrated in FIG. 13B, the front cover 303 is provided with a guide 365 for holding the intermediate member 551. The guide 365 is formed on the facing surface of the front cover 303 such that the guide 365 protrudes and is provided with a fitting hole 365a into which the base end of the intermediate member 551 can be fitted. The base end of the intermediate member 551 abuts onto the arm portion 503 of the conductor 501, the tip end of the intermediate member 551 abuts onto the exposure portion 407 of the circuit package 400, and the conductor 501 and the lead frame 401 of the circuit package 400 are electrically connected to each other. According to the above-described configuration, for example, it is possible to prevent the intermediate member 551 from falling off the fitting hole 365a while the front cover 303 is being attached to the housing 302 and to improve assembly workability.

In addition, as illustrated in FIG. 13C, the claw portion 504 provided on the tip end of the arm portion 503 of the conductor 501 may be stuck into the base end of the intermediate member 551 to hold the intermediate member 551 such that the intermediate member 551 becomes less likely to fall off.

As illustrated in FIG. 13D, the circuit package 400 may be provided with a guide 421 for installing the intermediate member 555 onto an exposed portion of the exposure portion 405. The guide 421 may be integrally provided with the circuit package 400 and may be provided separately from the circuit package 400.

In addition, as illustrated in FIG. 135, a recess formed on the rear surface of the circuit package 400 may be filled with a resin 422 such that the recess is hidden. Since the exposure portion 407 is formed by causing a portion of the lead frame 401 to be interposed between forming dies on the front surface side and the rear surface side, the recess is formed on the rear surface of the circuit package 400 as well. Therefore, the recess may be filled with the resin 422 for protection from gas and the like as well.

FIGS. 14A to 14F are views for describing configuration examples of a method of connecting the exposure portion 407 and the conductor 501.

Although an intermediate member 556 is formed of electroconductive rubber as with the intermediate member 551, the intermediate member 556 may have a shape other than a columnar shape or a prismatic columnar shape. For example, as illustrated in FIG. 14A, the intermediate member 556 may have a shape corresponding to the shape of a portion of the circuit package 400 in the vicinity of the exposure portion 407. According to this configuration, a tip end of the intermediate member 556 is fitted into the exposure portion 407 of the circuit package 400 and thus it is possible to prevent positional deviation of the intermediate member 556. In the present example, the circuit package 400 is provided with the guide 421 such that the positional deviation of the intermediate member 556 is further prevented.

Furthermore, an intermediate member 557 may be formed of a metal coil spring as illustrated in FIG. 14B. The intermediate member 557 is interposed between the exposure portion 407 of the circuit package 400 and the conductor 501 of the front cover 303 in a compressed state and electrically connects the lead frame 401 of the circuit package 400 and the conductor 501 to each other.

In an example illustrated in FIG. 14C, an outer guide 365 that covers an outer side of the intermediate member 557 at a position close to the base end of the intermediate member 557 and an inner guide 366 that is disposed inside the intermediate member 557 are provided on the front cover 303. Accordingly, it is possible to prevent the intermediate member 557 from falling off the front cover 303.

In an example illustrated in FIG. 14D, a second arm portion 505 is provided to continuously extend from the tip of the arm portion 503 of the conductor 501 and a tip end of the second arm portion 505 is in direct contact with the exposure portion 407 of the circuit package 400. According to this configuration, it is not necessary to separately provide the intermediate member and thus it is possible to decrease the number of components and to simplify an assembly operation.

In an example illustrated in FIG. 14E, the tip end of the second arm portion 505 is connected via a connecting method other than contact connection and for example, a bonding portion 506 that is bonded through welding, a conductive adhesive agent, or a paste is provided. Since the tip end is bonded to the exposure portion 407 via such a bonding portion 506, it is possible to more reliably establish electrical connection.

In a configuration example illustrated in FIG. 14F, the second arm portion 505 that protrudes from the arm portion 503 of the conductor 501 is formed to be folded into a bellows-like shape and the tip end is bonded to the conductor 501 via the bonding portion 506. The second arm portion 505 that is folded into a bellows-like shape abuts onto the exposure portion 405 of the circuit package 400 with a predetermined pressing force due to elastic deformation and is electrically connected to the exposure portion 405. According to this configuration example, it is possible to omit the intermediate member 551 and thus it is possible to decrease the number of components and to simplify an assembly operation. In addition, it is possible to decrease the number of contact points and to decrease a possibility of poor contact.

FIG. 15 is a view for describing another configuration example of the conductor. In FIG. 15, the conductor 501 provided on the front cover 303 is also illustrated.

A characteristic point in this configuration example is that the conductor 501 is provided with a shield portion 507 that faces and covers a region of the circuit package 400 in which the LSI 453 and a measuring element are provided. The shield portion 507 is formed to continuously extend from the arm portion 503 of the conductor 501, planarly extends in the cavity portion 342B of the housing 302, and is disposed to face the region of the circuit package 400 in which the LSI 453 and the measuring element are provided.

Since the thermal type flowmeter 300 is provided with a conductive circuit including the conductor 501, a shield effect with respect to an electric wave is improved and output error is improved. Particularly, since the electrical conductivity of a metal plate used for the conductor 501 is extremely great and the metal plate has a low intrinsic impedance. Energy of an electric wave cannot infiltrate into the metal plate since the intrinsic impedance of a space is tens of thousands of times the intrinsic impedance of the metal plate in terms of order. Therefore, it is possible to improve a shield effect with respect to an electric wave of the LSI 453 or the measuring element of the circuit package 400 by installing the conductive circuit which uses the metal plate. The electrical resistivity of the conductor 501 in an unprocessed state is very low and the conductor 501 has a merit that the conductor 501 is inexpensive, is distributed globally, and can be obtained easily. Surface treatment can be performed on the metal plate of the conductor 501 in order to improve corrosion performance.

In this configuration example, the conductor 501 is installed such that the shield portion 507 covers the entire LSI 453 and the entire measuring element. It is possible to further improve the shield effect by covering the entire LSI 453 and the entire measuring element with the shield portion 507 in this manner.

In the above-described configuration example, the description has been made by using a case where the conductor 501 is connected to the exposure portion 405 of the circuit package 400 as an example. However, the conductor 501 may be connected to, for example, the inner lead of the outer lead of the circuit package 400 as long as the conductor 501 can be connected to the ground.

Example 2

Next, Example 2 of the invention will be described. FIGS. 16A and 16B are views for describing a configuration of a conductor in Example 2 and FIG. 17 is a view for describing a configuration of a conductive circuit in Example 2.

A characteristic point in this example is that the conductor 501 is directly connected to an inner end 306b of the external terminal of the connector 306 instead of the lead frame 401 of the circuit package 400. The conductor 501 is configured such that the arm portion 503 extends up to the cavity portion 342A of the housing 302. As illustrated in FIG. 16B, the inner end 306b of the external terminal is folded into a crank-like shape in the cavity portion 342A. Specifically, the inner end 306b protrudes toward the tip end of the housing 302 from the flange 305 side of the cavity portion 342A at the central position in the thickness direction and the width direction of the housing 302, is folded toward the front cover 303 side at an intermediate position, is folded again at an end portion of the housing 302 in the thickness direction and the width direction, and a tip end portion thereof protrudes toward the tip end of the housing 302. Furthermore, when the front cover 303 is attached to the housing 302, the arm portion 503 of the conductor 501 abuts onto the tip end portion of the inner end 306b while overlapping the tip end portion in the cavity portion 342A such that the arm portion 503 is electrically connected to the tip end portion.

As illustrated in FIG. 17, the thermal type flowmeter 300 is provided with an AFS drive circuit 601 and a conductive circuit 602 on an AFS side. In addition, the connector 306 is connected with a connector coupler (not shown) on an ECU 603 side such that the connector 306 is electrically connected and thus the connector 306 can communicate with the ECU 603 by an electric signal.

The conductive circuit 602 is electrically connected when the connector coupler is connected to the connector 306. In the present example, the AFS drive circuit 601 and the conductive circuit 602 are configured separately from each other. Accordingly, for example, even when a surge is applied to the conductive circuit at the time of an assembly operation, since the circuit is in an electrically floating state, it is possible to prevent the AFS drive circuit 601 from being damaged.

Note that, connection with the conductive circuit 602 may be established by directly integrating the conductive circuit 602 with a connector terminal and may be established through welding or by using a conductive indirect member.

Hereinbefore, embodiments of the invention have been described in detail, but the invention is not limited to the embodiments, and various design changes can be made in a range not departing from the spirit of the invention described in claims. For example, the embodiments have been described in detail for easy explanation of the invention, but it is not limited to include all of the above-described configurations. In addition, a part of configurations of one embodiment can be substituted with configurations of another embodiment, and configurations of another embodiment may be added to configurations of one embodiment. In addition, addition, deletion, substitution of other configurations can be made with respect to parts of configurations of each embodiment.

REFERENCE SIGNS LIST

300 thermal type flowmeter
302 housing
303 front cover (cover)
400 circuit package
401 lead frame
403 resin material
404 mounting portion
405 exposure portion
406 slit
408 gold wire
451 flow rate measurement unit (sensor element)
452 temperature measurement unit (sensor element)
453 LSI (circuit component)
501 conductor
551 intermediate member (elastic member)

The invention claimed is:

1. A flowmeter comprising:
a flow rate measurement unit which measures flow rate;
a lead frame on which a sensor element of the flow rate measurement unit is installed;
a package which includes the lead frame and a circuit component installed on the lead frame, a portion of the lead frame being molded with a resin material,
wherein the package is provided with an exposure portion which is electrically connected to a conductor constituting a portion of a wall of a sub path with a portion of the lead frame exposed out of the resin material,
a housing in which the package is installed,
wherein the conductor is configured separately from the housing and the circuit component,
wherein the conductor is disposed to face the flow rate measurement unit and, wherein the conductor is formed of a metal plate.

2. The flowmeter according to claim 1,
wherein a conductive intermediate member is interposed between the conductor and the exposure portion.

3. A flowmeter comprising:
a flow rate measurement unit which measures flow rate;
a lead frame on which a sensor element of the flow rate measurement unit is installed;
a circuit component which is installed on the lead frame;
a package which includes the lead frame and the circuit component, a portion of the lead frame being molded with a resin material;
wherein the package is provided with an exposure portion which is electrically connected to a conductor constituting a portion of a sub path with a portion of the lead frame exposed out of the resin material, wherein the conductor is formed of a metal plate, and is disposed to face the flow rate measurement unit;
a housing in which the package is installed, wherein the conductor is configured separately from the housing and the circuit component; and,
a conductive intermediate member interposed between the conductor and the exposure portion, wherein the conductive intermediate member is formed of an elastic body that can be elastically deformed in accordance with a change in distance between the conductor and the exposure portion.

4. The flowmeter according to claim 3,
wherein the intermediate member is supported by the housing.

5. The flowmeter according to claim 3,
wherein the exposure portion is connected to a ground of the lead frame.

6. The flowmeter according to claim 5,
wherein the exposure portion is formed by providing an U-shaped notch, which is obtained by cutting the resin material, on an end portion of the package.

7. The flowmeter according to claim 5,
wherein the exposure portion is formed by providing a circular hole-shaped recess on a front surface of the package.

8. The flowmeter according to claim 5,
wherein the exposure portion is configured with an outer lead or an inner lead that protrudes from an end portion of the package.

9. The flowmeter according to claim 8,
wherein the outer lead or the inner lead is electrically connected when the outer lead or the inner lead is connected to a connector coupler on an engine control unit side.

10. A flowmeter comprising:
a flow rate measurement unit which measures flow rate;
a lead frame on which a sensor element of the flow rate measurement unit is installed;
a circuit component which is installed on the lead frame;
a package which includes the lead frame and the circuit component, a portion of the lead frame being molded with a resin material;
wherein the package is provided with an exposure portion which is electrically connected to a conductor constituting a portion of a sub path with a portion of the lead frame exposed out of the resin material;
wherein the exposure portion is connected to a ground of the lead frame, and wherein the exposure portion is formed by providing an U-shaped notch which is obtained by cutting the resin material on an end portion of the package and, wherein the exposure portion is provided on front and rear surfaces of the lead frame while being provided on the end portion of the package.

* * * * *